US011481652B2

(12) United States Patent
Knox

(10) Patent No.: US 11,481,652 B2
(45) Date of Patent: Oct. 25, 2022

(54) SYSTEM AND METHOD FOR RECOMMENDATIONS IN UBIQUITOUS COMPUTING ENVIRONMENTS

(71) Applicant: Gregory Knox, Van Nuys, CA (US)

(72) Inventor: Gregory Knox, Van Nuys, CA (US)

( * ) Notice: Subject to any disclaimer, the term of this patent is extended or adjusted under 35 U.S.C. 154(b) by 50 days.

(21) Appl. No.: 16/930,171

(22) Filed: Jul. 15, 2020

(65) Prior Publication Data
US 2020/0364588 A1 Nov. 19, 2020

Related U.S. Application Data

(63) Continuation-in-part of application No. 15/843,342, filed on Dec. 15, 2017, now abandoned, which is a continuation-in-part of application No. 15/188,997, filed on Jun. 22, 2016, now Pat. No. 9,894,415.

(60) Provisional application No. 62/874,506, filed on Jul. 16, 2019, provisional application No. 62/183,605, filed on Jun. 23, 2015.

(51) Int. Cl.
| | |
|---|---|
| *H04H 60/33* | (2008.01) |
| *G06N 5/04* | (2006.01) |
| *G06N 3/08* | (2006.01) |
| *H04L 67/125* | (2022.01) |
| *G06K 9/62* | (2022.01) |

(52) U.S. Cl.
CPC .............. *G06N 5/04* (2013.01); *G06K 9/6268* (2013.01); *G06N 3/08* (2013.01); *H04L 67/125* (2013.01); *G06K 9/6256* (2013.01)

(58) Field of Classification Search
CPC ....... H04L 67/12; H04L 67/2823; G06N 5/04; G06N 3/08; G06K 9/6268
See application file for complete search history.

(56) References Cited

U.S. PATENT DOCUMENTS

| | | | | |
|---|---|---|---|---|
| 8,769,556 | B2* | 7/2014 | Guo | H04H 60/45 725/10 |
| 2007/0124756 | A1* | 5/2007 | Covell | H04N 7/17318 725/18 |
| 2007/0157247 | A1* | 7/2007 | Cordray | H04N 21/443 725/47 |
| 2007/0271580 | A1* | 11/2007 | Tischer | H04N 21/4532 725/35 |

* cited by examiner

*Primary Examiner* — Michael B. Pierorazio
(74) *Attorney, Agent, or Firm* — David L. Cohen

(57) ABSTRACT

Systems and methods for creating an ad hoc pervasive computing environment comprised of an inference recommendation engine coupled to commodity devices and sensors that passively collect human activity and behavioral data. Methods include machine learning and deep learning applications that analyze data to generate preference based recommendations to assist, inform, and guide subjects interacting with a connected living space and their connected social network.

10 Claims, 17 Drawing Sheets

360

380

Generate a neural network model using engagement data, user data and interaction data associated with recommendation data to identify user intention information and desired outcome information
382

Using the model, calculate and assign weights and bias values to engagement data associated with user intention information and desired outcome information
384

Using the model, determine correlations between user intention and interaction outcome information compared to interaction recommendations
386

Is a minimum threshold met for weight and/or bias score that improves the accuracy of interaction recommendations?
388

NO → Do not initiate a recommendation for interaction and archive data for future reference
390

YES

Using the model, determine interaction recommendation hierarchy based higher correlation scores between user intent information and desired outcome information
392

Generate triggers using assigned weight and bias values to identify comparable engagement data, including weights and biases that indicate conditions, prerequisites, and precursors for interaction outcomes
394

Present and display recommendations to users and, where applicable, include conditions, prerequisites, and precursors for interaction outcomes
396

Update neural network model with changes to system data, user profile data, preference data (including user intention information and desired outcome information), interaction data, and content database associated with respective users.
398

| User or Group | Profile Map- Subjects | Mapped % |
|---|---|---|
| Uncle Terry - Homecare | Sleep, Foods, Television, Social Media, Music, Art, Activities, Books, Colors, Hygiene, Grooming Clothing | 45% |
| Bible Study Group | Foods, Books, Passages, Meeting Locations, Sermons, Attendance Calendar (times, days) | 77% |

Terry

| Subject | Category | Subcategory | User Data | % Mapped | Affinity Level | Error Ratio |
|---|---|---|---|---|---|---|
| Foods | Breakfast, Lunch, Dinner, Snack | | | | 0.2 | +1 |
| | | | | | | |
| | Breakfast | | | 60% | | |
| | | time of day | 6am-9am EST | | | |
| | | day of week | Sun, Mon, Wed | | | |
| | | food types | Oats, Coffee | | | |
| | | food combinations | Yes | | | |
| | | food temperatures | <110 degrees | | | |
| | | associated activities | Television | | | |
| | | other participants | Not likely | | | |
| | | environmental data | Bed, 72 drgs | | | |
| | | precursors, triggers | Wake +1 hr | | | |
| | Lunch | | | 50% | | |
| | | time of day | 11am-2pm EST | | | |
| | | day of week | Sun-Sat | | | |
| | | food types | Soup, Sandwich | | | |
| | | food combinations | Yes | | | |
| | | food temperatures | <110 degrees | | | |
| | | associated activities | Television | | | |
| | | other participants | Not likely | | | |
| | | environmental data | Kitchen, 72 drgs | | | |
| | | precursors, triggers | Activities, +1 hr | | | |
| | Dinner | | | 30% | | |
| | | time of day | 5pm-7pm EST | | | |
| | | day of week | Sun-Sat | | | |
| | | food types | Soup, Salad | | | |
| | | food combinations | Yes | | | |
| | | food temperatures | <110 degrees | | | |
| | | associated activities | Television, Music | | | |
| | | other participants | Not likely | | | |
| | | environmental data | Kitchen, 72 drgs | | | |
| | | precursors, triggers | Activities, +1 hr | | | |

FIGURE 5C

SYSTEM AND METHOD FOR RECOMMENDATIONS IN UBIQUITOUOUS COMPUTING ENVIRONMENTS

PRIORITY DATA

This utility application claims the benefit of priority to provisional application No. 62/874,506, filed on Jul. 16, 2019, and is a continuation-in-part of U.S. patent application Ser. No. 15/843,342, filed on Dec. 15, 2017, which is a continuation-in-part of U.S. patent application Ser. No. 15/188,997, filed on Jun. 22, 2016, now U.S. Pat. No. 9,984,415, which claims the benefit of priority to provisional application No. 62/183,605, filed Jun. 23, 2015.

COPYRIGHT NOTICE

A portion of the disclosure of this patent application contains material which is subject to copyright protection. While the copyright owner has no objection to the reproduction by anyone as the copyrighted material appears in the United States Patent and Trademark Office patent files or records, all rights are otherwise reserved.

BACKGROUND

Field of Disclosure

The present application relates generally to computerized artificial intelligence applications in pervasive computing environments, and more particularly, to systems and methods for providing inference recommendations that promote optimal user interactions with connected technologies and associated users.

Description of Related Art

Ubiquitous computing technologies, as one component of intelligent systems designed for technology enabled human experiences, can enhance user experiences in many aspects of connected lifestyles. The concept of ubiquitous or seamlessly continuous computing translates to user interaction(s) with any device or sensor, in any location, and in any format.

On a singular basis, today's ubiquitous computing configurations may generate data in the realm of Ambient Intelligence. These hardware and software configurations are designed to assist human decision making using realtime and historical data. Commodity sensors are embedded in connected consumer appliances, Internet of Things ("IoT") devices, and smart devices at such levels that ad-hoc ubiquitous computing (hereinafter "ubicomp") environments can be established by pairing basic connected devices with neural network applications that interpret collected data. Measuring available device/sensor data to reliably and accurate measure and predict user preference is technologically feasible considering the volume of lifestyle data that can be collected with common devices such as human physiology and biometric information using wearable sensors, facial expressions and moods detectable with computer vision, location with GPS, movement and activity that can be labeled and measured with cameras, accelerometers and gyroscopes.

Generally, this commodity device and sensor evolution has driven their cost down and increased their ubiquitous presence in everyday life. Most applications may operate to deliver a defined user experience through a single or a few data signals, where the performance promised is consistently delivered. However, a narrowly focused user experience limits the ability to extract user insights and leverage collected data. Further, the existence of multiple device and sensor data channels that denote interactions does not equate to "insights" where there is little means of learning or contextualizing user experiences.

Overall, there is sufficient data, hardware, software and computing capacity to approach limited forms of evaluating and predicting human behavior at a consumer level. Passive preference data or "inference intelligence" may be achieved in pervasive environments, especially considering edge computing architectures where data science methods such as customized machine learning, deep learning and artificial intelligence applications are deployed on devices to parse, analyze and interpret data. With adequate reference information, in certain lifestyle settings it is plausible to elevate understanding of the user's subjective mind before, during, and after engagement experiences.

SUMMARY

In one aspect of the present disclosure, a method of tracking the activity of at least one human from at least two ubicomp devices is disclosed. The method may include the steps of generating tracking data from each of the at least two ubicomp devices, collecting each of the generated tracking data, conglomerating each of the generated tracking data, converting the conglomerated tracking data into at least one standardized data format, classifying the converted conglomerated generated tracking data by interaction preference insights, and transmitting recommendations for the at least one human based on the classified converted conglomerated generated tracking data.

In another aspect of the present disclosure, the method of tracking the activity may also include pairing the two or more ubicomp devices. The ubicomp devices may include a smart meter, a smart thermostat, a smart temperature sensor, a smart humidity sensor, a smart barometric sensor, a smart pressure sensor, a smart motion sensor, a smart frequency sensor, a smart radiation sensor, a smart light sensor, an IoT device, a smartphone, a smart watch, a smart window shade, a smart garage door, a smart outlet, a smart switch, a smart tablet, smart audio system, a smart TV, a smart mirror, a smart monitor screen, a smart camera, a smart pet feeder, a smart dishwasher, a smart washer/dryer, a smart microwave, a smart oven, a smart toaster, a smart coffee maker, a smart dishwasher, a smart refrigerator, a smart water faucet, a smart vacuum, a smart toy, a smart tracker, a smart door locks, a smart irrigation system, a smart energy monitoring, and/or a smart voice activated service.

In another aspect of the present disclosure, the step of transmitting recommendations may include using an inference recommendation engine system to generate interaction recommendations to the human.

In another aspect of the present disclosure, the generated tracking data may include activity and behavioral data from the human, and the method of tracking the activity may also include analyzing the activity and the behavioral data from the each of the generated tracking data.

In another aspect of the present disclosure, the method of tracking the activity may also include generating the interaction recommendations of the at least one human in response to analyzing the activity and the behavioral data.

In another aspect of the present disclosure, the interaction recommendations may include time, location, frequency, duration and/or sentiments.

In another aspect of the present disclosure, the method of tracking the activity may also include updating the interaction recommendations on at least one of a time frequency basis, a biometric level basis, an emotion level basis, a sentiment level basis, a motion level basis, a temperature level basis, a humidity level basis, a barometric level basis, a light level basis, a frequency level basis and a radiation level basis.

In another aspect of the present disclosure, the step of transmitting recommended interactions may include generating a feedback to the paired at least two ubicomp devices.

In another aspect of the present disclosure, the method of tracking the activity may also include storing the generated tracking data in at least one cloud computing network.

In another aspect of the present disclosure, a network for tracking the activity of at least one human from two or more paired ubicomp devices is disclosed. The network may include a first and a second track computing device for generating tracking data from each of the at least two paired ubicomp devices, a collect computing device for collecting each of the generated tracking data, a conglomerate computing device for conglomerating each of the generated tracking data, a convert computing device for converting the conglomerated tracking data into at least one standardized data format, a classify computing device for classifying the converted conglomerated generated tracking data by interaction preference insights, and a transmitting device for transmitting recommendations for the at least one human based on the classified converted conglomerated generated tracking data.

In another aspect of the present disclosure, the ubicomp devices may include a smart meter, a smart thermostat, a smart temperature sensor, a smart humidity sensor, a smart barometric sensor, a smart pressure sensor, a smart motion sensor, a smart frequency sensor, a smart radiation sensor, a smart light sensor, an IoT device, a smartphone, a smart watch, a smart window shade, a smart garage door, a smart outlet, a smart switch, a smart tablet, smart audio system, a smart TV, a smart mirror, a smart monitor screen, a smart camera, a smart pet feeder, a smart dishwasher, a smart washer/dryer, a smart microwave, a smart oven, a smart toaster, a smart coffee maker, a smart dishwasher, a smart refrigerator, a smart water faucet, a smart vacuum, a smart toy, a smart tracker, a smart door lock, a smart irrigation system, a smart energy monitoring, or a smart voice activated service.

In another aspect of the present disclosure, the transmitting device may include an inference recommendation engine system to generate interaction recommendations to the at least one human.

In another aspect of the present disclosure, the first and a second track computing devices may include an analyzing computing device for analyzing activity and behavioral data from the tracking data of the at least one human.

In another aspect of the present disclosure, the network may include an interactive computing device for generating the interaction recommendations in response to the analyzing computing device analyzing the activity and the behavioral data.

In another aspect of the present disclosure, the interaction recommendations may include time, location, frequency, duration or sentiments.

In another aspect of the present disclosure, the network may also include an updating computing device for updating the interaction recommendations on the basis of time, a motion level, a temperature level, a humidity level, a barometric level, a light level, a frequency level and a radiation level.

In another aspect of the present disclosure, the transmitting device may generate a feedback signal to the paired ubicomp devices.

In another aspect of the present disclosure, the network also may include a cloud computing network coupled with the first and the second track computing devices for storing the generated tracking data from the two paired ubicomp devices.

BRIEF DESCRIPTION OF THE DRAWINGS

The present disclosure and its various features and advantages can be understood by referring to the accompanying drawings by those skilled in the art relevant to this disclosure. Reference numerals and/or symbols are used in the drawings. The use of the same reference in different drawings indicates similar or identical components, devices or systems. Various other aspects of this disclosure, its benefits and advantages may be better understood from the present disclosure herein and the accompanying drawings described as follows:

FIG. 3E illustrates a flow diagram for optimizing interaction recommendations using interaction data associated with a ubiquitous computing environment according to an aspect of the present disclosure;

FIG. 5C illustrates a user experience preference map generated from user interaction recommendation survey information presented on an engagement platform according to an aspect of the present disclosure.

DETAILED DESCRIPTION

Figure 1A:
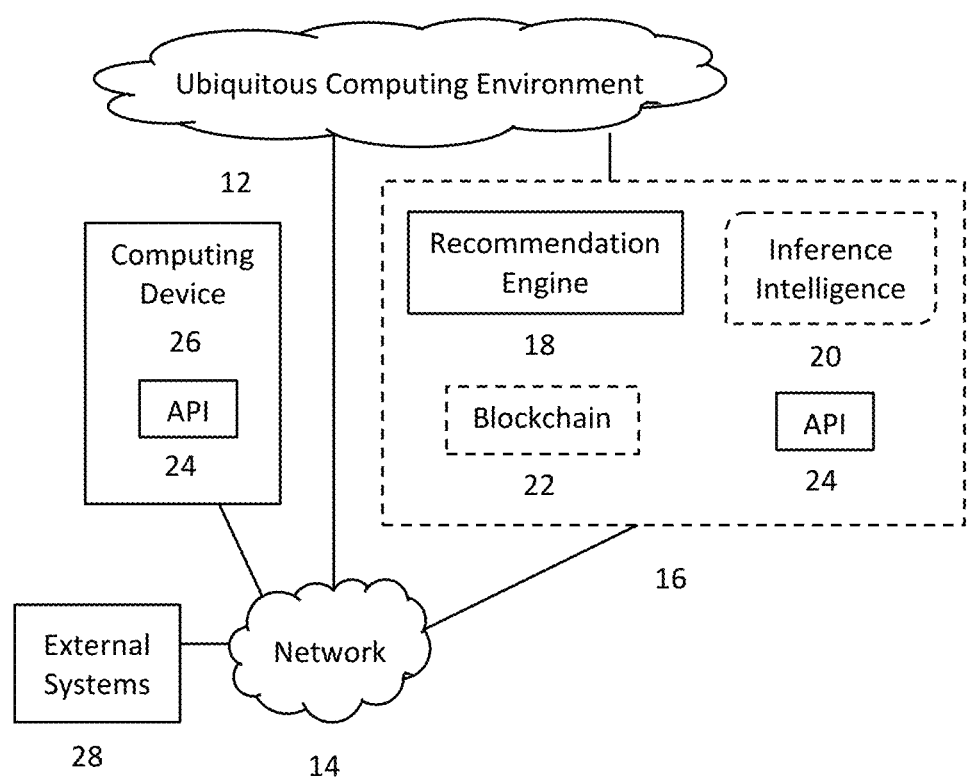
FIG. 1A illustrates a network block diagram depicting an engagement platform system including a ubiquitous computing environment, network, server, recommendation engine, inference intelligence, blockchain, application program interface, computing device, and external systems according to an aspect of the present disclosure.

The benefits of augmenting lifestyle experiences with neural network solutions may be known. An economically viable system using basic devices and sensors to generate reliable intelligence regarding a person's lifestyle preferences is useful to the subject, families, friends, medical support and any remotely connected social network or service provider. Further, a method of presenting interaction recommendations based on known behaviors, learned engagement preferences and intended outcomes creates new channels of communication for user lifestyle insights. And, accuracy and efficiencies in response time, anticipating needs, and assistance requirements become more informed with sensor level and machine learning reliability. Lastly, the proposed applications require secure collection, storage and exchange of the aforementioned data. Ideally, incorporating an immutable technology such as blockchain encryption would deter and prevent modification of such data, reducing the risk of theft or misuse and ensuring that only authorized users will have access to personal data.

Systems and methods, in accordance with various examples of the disclosure, may address one or more of the aforementioned deficiencies experienced in generating comprehensive interaction recommendations using commodity sensors that accurately reflect the intent and desired outcome for users. In particular, various aspects of the disclosures enable the capture, analysis and presentation of behavioral, sentiment, biometric and lifestyle activity data of a subject that associated users may wish to acknowledge and respond to in a timely manner. Generally, an interaction recommendation system can provide recommendations for an unlimited set of user engagement instances or events, where optimal performance assumes the availability of adequate sensor data, computing capacity, and reference information.

In addition to personal device lifestyle integrations, the "connected lifestyle" has moved far beyond configurations for traditional networked systems such as lighting controls, heating and cooling, audio and video, and security cameras. With the growth of IoT innovations, data driven applications that measure specific and comprehensive interactions is plausible given the wide range of consumer products that are available embedded with network applications such as microwaves, ovens, toasters, coffee makers, dishwashers, refrigerator, water faucets, vacuums, toys, smart trackers, smart door locks, irrigation systems, energy monitoring, and voice activated services and computers.

A ubiquitous computing environment or ubicomp can be created on an ad-hoc or permanent basis using a few or several connected consumer products common in dwellings that operate on LAN and WIFI networks: cameras, motion sensors, smart phones, thermostats, door entry/exit sensors, wearable devices, tablets, and smart TVs. Software applications on basic cameras in devices now identify faces, interpret facial expressions, identify objects, recognize gestures and can measure a series of physical movements to catalog specific activity types. As mentioned previously, most of the information generated by these devices and sensor signals offer singular channels of data insights. Yet, given the networked environment they operate within, there is tremendous potential gain using methods that conglomerate these information sources and leverage their singular data channels into more robust and contextualized insights.

There may be noticeable aspects to adding context and customized information to interactions involving connected devices and sensors that improve upon current technology. First, inference intelligence can elevate basic engagements with connected technologies. Most connected devices require human input-physical controls for settings, remote control via mobile application, or voice commands delivered from a voice enabled computer. These actions, and the decision points that lead up to them, can be anticipated with current software applications. However, predictions for singular actions are predicted based on user repetition, this level of engagement is largely devoid of context and does not provide much insight regarding intent, motive, desired outcome, special conditions and etc. For example, if a coffee maker is set to make coffee every day at 6 AM, but the subject chooses to sleep in until 8 AM, how would the coffee maker adjust to the circumstance without human intervention? The present disclosure herein, for example, details a system for identifying sleep conditions, which may include use camera motion sensors or sleep app data from a mobile phone to determine the waking phase of a subject, which then triggers the coffee maker operation based on real-time inference data that adjusts to different waking times each day.

Second, inference intelligence can elevate engagement insights for interactions between users. With current technologies, human activities and experiences in a living space can be identified, tracked, measured and ultimately cataloged and labeled as routines and habits. While lifestyle routines and habits themselves are suggestive of preference, inference data can be used to understand contextualized exceptions to a daily scheduled activity. For remotely connected users, inference intelligence offers greater accuracy and efficiency to engagement decision points. Using the previous example, if the subject in the ubicomp is connected to a social network with access to inference intelligence, they then have the ability to adjust to the real-time circumstances based on notification updates. In context, if the subject sleeping has an appointment schedule or visitor set to arrive at a particular time, inference intelligence could deliver automated updates to the third parties as to the optimal times to engage with the individual once they reach a waking state, or after the coffee maker has been activated for more than 15 minutes.

Third, inference intelligence applications can leverage natural language processing for rich contextual information. For an unlimited number of theoretical scenarios, acquiring sentiment, desire and intent before, during and after an engagement efficiently aid machine learning applications that perform predictive analytics and offer customized recommendations for each unique individual. Obtaining a user's subjective thoughts and preferences in real-time will dramatically improve artificial intelligence solutions in pervasive environments that connect many distinct devices and sensors.

Fourth, improving efficiency and accuracy for human engagements yields significant intangible benefits. Especially for remote relationships, the opportunity to interact with another person, where timing and context are mutually understood beforehand, deliver a wealth of collateral benefits regarding mental health, emotion support, and intellectual stimulation. Deep learning applications increase insight data with continuous interactions and improve recommendation quality for all parties regarding optimal engagement conditions, timing, best practices, contingencies for unforeseen circumstances and the like.

According to an aspect of the present disclosure, an inference recommendation engine system and method for generating interaction recommendations informed by user centric activity and behavioral data collected from commercial devices and commodity sensors in a pervasive computing environment are detailed. The present teaching does not represent the entirety of the disclosure herein in either scope or implementation. Although the disclosed aspects described herein in sufficient detail to enable one skilled in the art to practice the implementations, it is to be understood that these examples are not limiting. Consequently, other implementations, aspects, arrangements and/or configurations may be derived from the disclosure herein without departing from their spirit and scope.

The present discloses teaches a software solution for improving human interactions by using data provided by disparate networked devices and sensors operating in a subject's dwelling to identify interactions and the subject's preferences (time, location, frequency, duration, sentiments) for each interaction. This preference data can be used guide, assist and inform users within a dwelling or to others via connected devices.

An enterprise solution can be deployed via cloud or edge architecture whereby a networked client device (smart phone) can connect to a network hosting devices and sensors that identify and/or measure human activity and behaviors. Data from these connected devices and sensors can be collected via an API and processed via cloud computing into usable formats where analytic applications can determine a subject's interactions as well as interaction preferences, recommendations and predictive analytics for interactions for other connected users.

In one aspect of the present disclosure, systems and methods are taught for conglomerating information and converting it into a standardized data format. This may be applied in commodity sensors and consumer devices that may operate on standard networks (e.g., Wi-Fi, Bluetooth, etc.), providing information regarding human activity and behaviors. These interactions may be classified and interaction preference insights more clearly identified-information that can inform and guide interaction recommendations for the subject and their associated users.

This approach is now technically feasible due to specific changes in the consumer technology landscape. First, the cost of sensors and devices that provide activity and behavior data have dropped dramatically, while their functional utility and data quality has increased. Second, commodity sensors (cameras, wearables, wireless chipsets) are now deployed at a ubiquitous level and are actively capturing user information of all sorts (sleep, activity level, activity types, gestures, diet, physiological biometrics, location, media consumption, sentiments, social connectivity). Third, major competitors (e.g., Apple, Google, Microsoft) and smaller companies are developing these technologies at a fast pace, offering open source platforms for integrating disparate hardware and software technologies on a single platform. Growing artificial intelligence software chipsets markets, edge computing solutions for low latency as well as improved network capacity and speed lend support for the viability of the proposed technology.

In one aspect of the present disclosure, systems and methods are taught for conglomerating information and converting it into a standardized data format. This may be applied in commodity sensors and consumer devices that may operate on standard networks (e.g., Wi-Fi, Bluetooth, etc.), providing information regarding human activity and behaviors. These interactions may be classified and interaction preference insights more clearly identified-information that can inform and guide interaction recommendations for the subject and their associated users.

The present disclosure, in one aspect, may use a multi-channel or multimodal solution more efficiently to enable a subject's unique set of lifestyle experiences to be captured in a digital profile (within the limitations of accessible devices and sensors). Personalized data may be ubiquitously available due to lifestyle preferences for convenience, fear or missing out ("FOMO"), and surreptitious device privacy settings.

The present disclosure teaches a data agnostic system for capturing device and sensor data from connected technologies in a dwelling inhabited or occupied by a subject or subjects, converting information to a usable format, applying pattern and preference recognition neural network applications, and providing instructions for recommendation or predictive analysis models that guide and inform users inside and outside the dwelling. This information is customized based on a unique subject's lifestyle habits, routine and experiential preferences, and with machine learning becomes increasingly refined as empirical data is generated to improve insight analytics.

In one aspect of the disclosure, a software application for an enterprise level architecture is taught. The enterprise level architecture may include a cloud computing network and storage resources, which could be deployed in a hybrid edge computing configuration for efficiency and energy priorities. A downloadable mobile software or lite client version can operate on a smart device that connects to a local network and identifies available devices and sensors as engagement data resources. This may be the basis for a ubiquitous computing environment. Captured data can be converted in the cloud to a usable format where bulk processing and analytics operate. Once sufficient data is captured to define an interaction by the system, user settings can be created based on the user's preferences for the interaction. The preference data or "inference intelligence" can be input from directly from a user or learned by the system over repeated interactions. For known interaction associates of a human subject, recommendation and predictive analytic information is sent via an API to the user of smart device, and this information can be incorporated into automated operation commands for networked devices and sensors.

Referring to FIG. 1A, a network diagram of an engagement platform system for interaction recommendations 10 in which broad implementations of the disclosure may be used. System 10 includes ubiquitous computing environment 12, network 14, server 16, recommendation engine 18, inference intelligence 20, blockchain module 22, application program interface 24, computing device 26, and external system 28. For purposes of illustration, the aspect of system 10, shown by FIG. 1A, includes single components of the system 10, however, in other aspects, system 10 may include more than one ubiquitous computing environments 12, networks 14, servers 16, recommendation engines 18, inference intelligences 20, blockchain modules 22, application program interfaces 24, computing devices 26, and external systems 28. System 10 provides a platform to improve methods of engagement and interaction for subjects within and associated users outside of ubiquitous computing environment 12 based on data collected and interpreted from the system 10. Though the central focus of system 10 is the subject(s) observed activities, moods, physiological measurements, biometric data and behaviors within ubiquitous computing environment 12, system 10 may also acquire information about associated outside users using APIs 24 operating computing devices 26 to better understand engagement and interaction related data that may elevate interaction recommendation quality, efficiency, and reliability.

Generally, ubiquitous computing environment (hereinafter "ubicomp") 12 is comprised of software and hardware components including portable and fixed networked devices, sensors and appliances. In some examples, ubicomp 12 may be comprised by a few or collection of networked devices and sensors detailed in FIG. 1B. In some aspects, ubicomp 12 may be represented by common components of a home automation system such as networked lighting controls, audio controls, video controls, temperature sensors, alarm sensors, smoke and fire sensors, internet enabled devices, IoT devices and sensors, and other consumer peripherals. In some aspects, ubicomp 12 may be represented by a smart phone and a wearable sensor device, such as a smart watch. Overall, ubicomp 12 operation and utility is defined by the composition of available device and sensor resources that may function to capture human activity and behavioral data signals, regardless to the original commercial applications created by the respective manufacturers. For example, if a security camera was installed with motion detection software by the manufacturer to detect movement, then the present innovation may use the same data signal to measure emotions, identify gestures, label objects, and the like. In some aspects, system 10 collects available data signals generated by ubicomp 12 devices and sensors to reformat, index and catalog for use by recommendation engine 18 and inference intelligence 20.

System 10 can be implemented according to ubicomp 12 configurations that vary based on device and sensor inputs and the raw and processed data generated accordingly. In some aspects of the present disclosure, ubicomp 12 comprises a Body Area Network (BAN) where one or more sensors are carried by a subject. In some aspects ubicomp 12 comprises a Personal Area Network (PAN) where one or more sensors are deployed in a physical environment. In some aspects, by example, ubicomp 12 devices and sensors can execute programming and operations, including but not limited to, detect physical movement, classify and label a set of actions as activity (sleeping, walking, cooking, grooming, etc.), recognize physical objects and their status, measure cognitive levels, identify emotions, learn personal patterns and lifestyle habits, signal and message remote users regarding activity events or data related benchmarks.

In some aspects, system 10, ubicomp 12, server 16, recommendation engine 18, inference intelligence 20, blockchain module 22, application program interface 24, computing device 26, and external system communicate, operate and transfer data thru network 14 with implementations that may use standard communications technologies including the Internet, wired and wireless, intranets, local area network (LAN), wide area network (WAN), Ethernet, 802.11, worldwide interoperability for microwave access (WiMAX), 3G, 4G, CDMA, GSM, LTE, digital subscriber line (DSL), broadcast network, and the like. In one aspect, network 14 may use networking protocols in some aspects that include simple mail transfer protocol (SMTP), file transfer protocol (FTP), multiprotocol label switching (MPLS), transmission control protocol/Internet protocol (TCP/IP), User Datagram Protocol (UDP), hypertext transport protocol (HTTP), and the like. The data exchanged over network 14 can be encrypted using conventional encryption technologies such as secure sockets layer (SSL), transport layer security (TLS), and Internet Protocol security (IPsec) and formatted using technologies including hypertext markup language (HTML), extensible markup language (XML), and the like. In some aspects, network 14 is a data center, edge computing or cloud based computing system architecture, or combination therein, connected via the Internet using a set of computing systems, computing resources, storage hardware, security applications and networking equipment.

One or more servers 16 may be coupled to ubicomp 12 and network 14 in addition to providing selected data and information access to computing device 26 and external system 28. In some aspects, server 16 is a comprised of a server network. In some aspects, server 16 is an independent host, gateway and network access within system 10 for recommendation engine 18, inference intelligence 20, blockchain module 22, and application program interface 24, respectively.

Generally, recommendation engine 18 collects ubicomp 12 data for processing, analysis, indexing, labeling, and cataloging human activity and behavioral data. In some aspects, recommendation engine 18 manages artificial intelligence, machine learning, deep learning and other neural network applications to process, analyze, convert and interpret ubicomp 12 information into human activity and behavioral data for use by system 10 components and inference intelligence 20. In some aspects, recommendation engine 18 correlates inference intelligence 20 with human activity and behavioral data.

Inference intelligence 20 is system 10 network agent of recommendation engine 18. In some aspects, inference intelligence 20 is neural network application including but not limited to artificial intelligence, machine learning, and deep learning applications. In some aspects, inference intelligence 20 collects and conglomerates data from system 10 components including subjects within ubicomp 12, devices and sensors within ubicomp 12, recommendation engine 18 processed data, computing device 26 data and generic reference data provided by external systems 28 for use with neural network models. In some examples, neural network models determine contextual data related to conditions, circumstances, triggers, indicators, and variables that reliably and accurately correlate user preference, expectation desired outcome with the collected and referenced human activity and behavioral data for a specific engagement or interaction type.

Blockchain module 22 architecture serves to protect data generated by system 10 processes and user activity. In some aspects, blockchain module 22 is comprised of cryptographically secure process steps including but not limited to user activity data record generation, data record validation, data transaction history, audience feedback data, and user profile data with immutable blockchain techniques. In some aspects, blockchain module 22 may include a private blockchain, public blockchain, blockchain database, blockchain processor, data anonymizer and crypto wallet.

Application program interface (API) 24 applications enable ubicomp 12 subjects and computing device 26 user access to system 10 components. In some aspects, API 24 is coupled to ubicomp 12 devices and sensors. In some aspects, API 24 is a software program operated with user interface application on computing device 26. In some aspects, API 24 is a host, network 14 gateway, and programmatic interface for computing device 26 which facilitate and manage communications with system 10 components, other system 10 users remotely operating computing devices 26, recommendation engine 18 data exchanges, and external systems 28. In one example, API 24 may be operated by users to create user accounts with profile information detailing engagement types and interaction preferences. In another example, API 24 may be operated by users to identify and configure ubicomp 10 devices and sensors for access, data exchange, and operation by system 10 components.

Computing device 26 is comprised of components such as network communications, data processing, interface controls, camera, display screen, microphone, speaker and the like such that a user can interact with system 10 components and other computing device 26 users. In some aspects, a computing device 26 aspects include smart devices, smart phones, portable computers, smart televisions and the like. Computing device 26 or a plurality of computing device 26 can send and receive input from users and transmit and receive data via network 14 using protocols that may comprise any combination of local area and/or wide area networks, using wired and/or wireless communication systems. In some aspects, computing device 26 executes operations using an operating system such as a Microsoft Windows compatible operating system (OS), Apple OS X, Linux, iOS, Tizen and/or ANDROID. In some aspects, computing device 26 executes a browser application to access server services on network 14 such as video services, audio services, email services, instant messaging, Web services, third-party services, (IM) services, SMS services, MMS services, FTP services, voice or IP (VOIP) services, calendaring services, phone services, advertising services, etc. In one example, computing device 26 may interact through an API 24 with an external system 28 such as website, server, an electronic data file, electronic messaging service, data server, blockchain server, IP telephony platform, media server, third-party social network, or automated e-commerce service. In some aspects, computing device 26 may display content by processing a markup language that describes instructions for formatting or presentation of content such as (XML) data, extensible hypertext markup language (XHTML) data, JavaScript Object Notation (JSON) data, JSON with padding (JSONP), and JavaScript data or other markup language data. In some aspects, computing device 26 includes one or more data cookies indicating such system 10 operations as log in, location, interactions with ubicomp 12 related data, communications with other computing device 26, log of physical time within ubicomp 12, and current computing programs and operating systems. In some aspects, a single or multiple computing devices 26 are operating as components of ubicomp 12. In one example, a computing device 26 may operate within ubicomp 12 in aspects including but not limited to wearable device, camera, laptop computer, tablet computer, smart television, networked appliance, home automation control apparatus, networked sensors and other hardware detailed further in FIG. 1B.

Figure 1B:
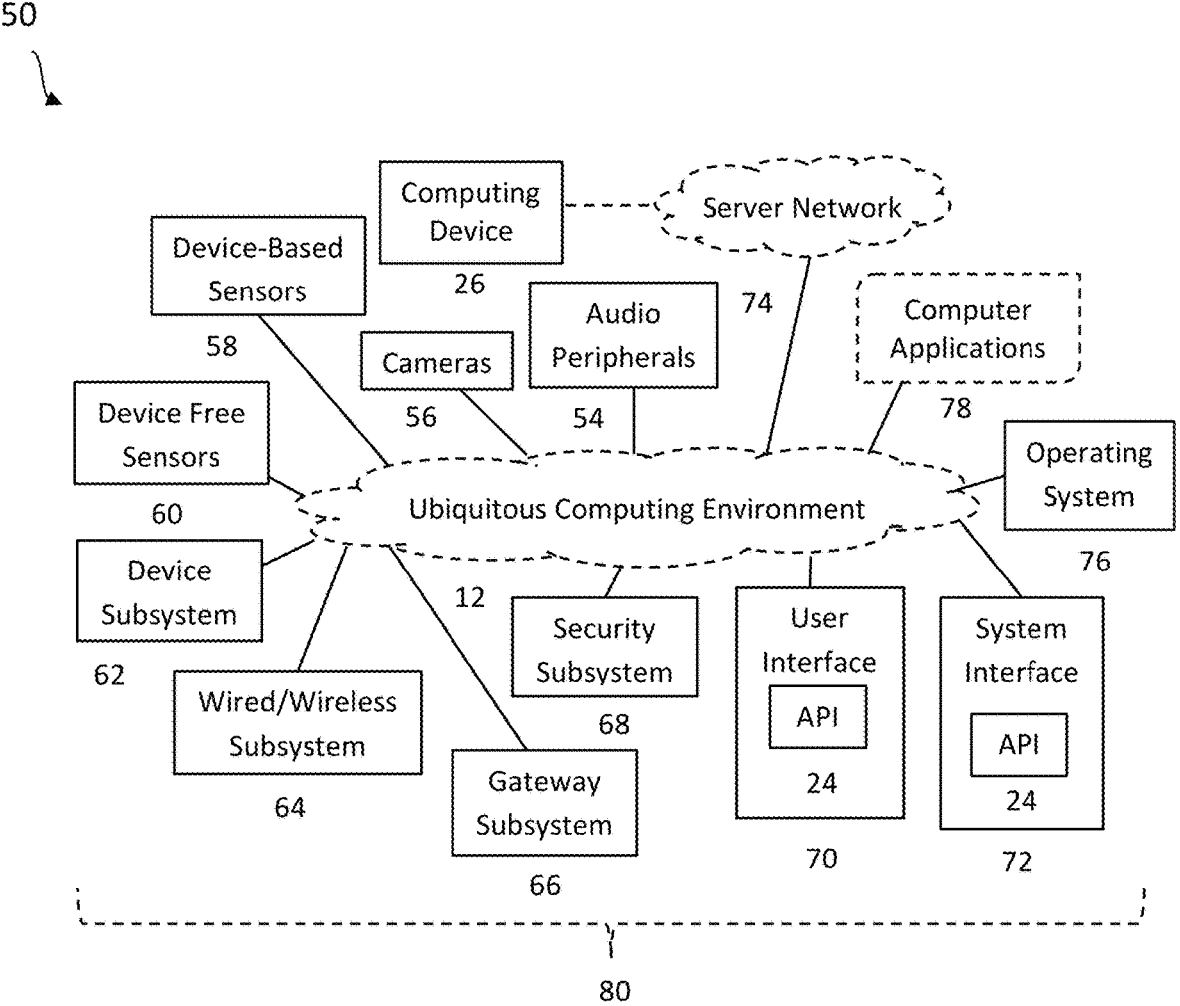
FIG. 1B illustrates a system block diagram of a ubiquitous computing environment including computerized neural network application generated data according to an aspect of the present disclosure.

FIG. 1B is a diagram illustrating an exemplary ubiquitous computing architecture 50 including components and associated data configured for recommending interactions between users of system 10 related to human activity and behavioral data captured by devices and sensors. The basic purpose of a ubiquitous computing environment or "ubicomp", also referred to as "pervasive computing," is user interaction with any device, in any location, and in any format. In the present disclosure, ubicomp 12 includes networked hardware and software components coupled to recommendation engine 18 that are configured and programmed (per system 10) to execute computerized processes that, amongst other functions, generate "engagement data" 80 derived from user initiated, user controlled and automated device, appliance and sensor operations within ubicomp 12 that detect, track, identity and measure human activity and behaviors.

For discussion purposes, human activity and behavioral data collected from engagement data 80 extracted from ubicomp 12, and related components including API 24 and computing device 26, may be identified, indexed, labeled, formatted and stored according to processing and analytics requirements and specifications of respective recommendation engine 18 and inference intelligence 20 applications. Where recommendation engine(s) 18 operate to identify and name activities, habits, routines and behaviors derived from processing and analyzing engagement data 80 associated with a subject in ubicomp 12, inference intelligence 20 applications operate to correlate activity, habit, routine, and behavior data identified by recommendation engine 18 with measurable data indicating user intent, preference, context, desired outcome, unique conditions and etc., such as facial expressions, emotions, moods, biometrics, event frequency, and natural language data generated by system 10 usage.

Ubicomp 12 can be established for system 10 applications with at least network 14, server 16, API 24 where network 14 hosts and server 16 stores data transfers and exchanges between API 24 and ubicomp 12 networked components and software. Ubicomp 12 hardware, devices, peripherals, appliances, firmware and software applications may be represented in an unlimited variety of configurations and the descriptions of aspects are not limited to those presented in this disclosure. For example, in one aspect an exemplary ubicomp 12 arrangement may include 30-50 networked components (sensors, cameras, wearables, appliances, home automation controls, etc.) delivering data to recommendation engine(s) 18 to practice the disclosed innovations while in another aspect ubicomp 12 configuration requires only a few networked components, such as a smart phone and a coffee maker to deliver the inventive advantages described herein.

In some aspects, ubicomp 12 may include a subsystem of audio peripherals 54 including networked microphones capable of capturing audio signals including human speech, voice, audible commands, tones, sounds and radio frequencies. A microphone 54 may be a stationary in a fixed location as a stand-alone device, or may be a component of a device 26 or appliance that is stationary or portable. In some aspects, ubicomp 12 may include a subsystem of networked cameras 56 include devices capable of capturing, detecting and identifying data activities associated with everyday lifestyle including but not limited to an image of an object, brand, brand label, physical object, person, animal, face, face of person linked to a user profile account, facial expression reflecting an emotion, physical gesture, gesture combination, eye gaze, eye movement and similar representing them in the form of digital data. Cameras 56 may be sensitive across the visible spectrum or a confined wave such as infrared (IR) or ultraviolet bands and, in some aspects, are capable of capturing video images at least 30 frames per second and 1920 pixels per line. Camera 56 may be a stationary in a fixed location as a stand-alone device, or may be a component of a device 26 or appliance that is stationary or portable. In some aspects, ubicomp 12 may include a subsystem of networked device-based sensors 58 including inertial sensors (such as accelerometer, vibration or magnetic fields) for measuring activity related signals; bio-sensors capable of measuring physiological signs such as electrocardiogram (ECG), electromyogram (EMG), heart rate (HR), body temperature, electrodermal activity (EDA), surface electromyography (sEMG), arterial oxygen saturation (SpO2), blood pressure (BP) and respiration rate (RR) for monitor physical states including heart rate, heart rate variability, respiratory rate, number of steps, distance traveled, pace, maximal oxygen consumption, sleep stages (REM, light and deep), sleep quality, food and liquid intake; Internet of Things sensors (IoT) for physical devices, vehicles, home appliances and other items embedded with sensors which enable these objects to connect and exchange data; radio frequency sensors such as Wi-Fi, Wi-Fi Mesh, and WiMAX 3G, 4G, 5G, GSM, ZigBee, Bluetooth, Bluetooth LE, ANT, Near Field Communication (NFC), and terrestrial digital broadcasts of television and radio signals (HF radio, UHF TV, DAB, DVB, GSM). Device-based sensors 58 may be a stationary in a fixed location as a stand-alone device, or may be a component of a device 26 or appliance that is stationary or portable. In some aspects, the device-based sensors 58 are coupled to one or more actuators associated with complex mechanisms operating within ubicomp 12. In some aspects, ubicomp 12 may include a subsystem of networked device free sensors that monitor and capture structural or environmental data 60 that may be stationary in a fixed location as a stand-alone device or may be a component of a device 26 or appliance that is stationary or portable, including but not limited to pressure or force sensors to track weight change, footsteps and location; ultrasound to indicate relative location of devices; infrastructure-mediated such as resistance to detect inductive electrical load changes; luminosity sensors to detect light levels; electromagnetic interference to detect proximity; water pressure to detect change in water-pressure within the pipe system; gas flow to detect gas consumption; electromagnetic noise to detect electrostatic discharges from humans touching and gestures; and passive radar that detects and tracks objects.

In some aspects, ubicomp 12 has a device subsystem 62 to access control protocols that manage devices, device features, network configuration, network communications, power consumption and transmission power output. In some aspects, ubicomp 12 has a wired and/or wireless subsystem 64 to control access protocols for devices operating within ubicomp 12 that are mobile and require multi-hop wireless connectivity schemes. In some aspects, ubicomp 12 has a gateway subsystem 66 to control sensor and device subsystem access to other network systems such as Wide Area Networks (WANs), the Internet, cellular or satellite. In some aspects, ubicomp 12 has a security subsystem 68 to control user access, encryption identity verification, and defeat gateway attacks. In some aspects, security subsystem 68 is coupled to a blockchain system 26 and related components. In some aspects, ubicomp 12 may include user interface device 70 that is coupled to application program interface 24. In some aspects, ubicomp 12 may include system interface device 72 that coupled to application program interface 24. In some examples, user interface device 70 and system interface device 72 communicate and exchange data via networked ubicomp 12 devices and components that operate API 24 such as a mobile phone, wearable device, television, computer, home appliance, audio system, tablet an electronic keypad, and the like. In some examples, user interface 70 and system interface 72 via API 24 may enable operation of networked controls, sensors, devices, and systems within ubicomp 12 such as an appliance, camera system, audio system, television, computerized device, light, interior/exterior dwelling mobile robot or aerial drone. In some examples, user interface 70 and system interface 72 via API 24 manage administrative functions including but not limited to user access authority; user and device access levels, information access permissions, communication access, passwords, content filters, and security parameters for devices and users within ubicomp 12 and remote access to ubicomp 12 including networked systems, users and user groups, and computing devices 26. In some examples, system interface 72 via API 24 may communicate with computing device 26 to enable remote operation of networked controls, sensors, devices, and systems within ubicomp 12. In some aspects, ubicomp 12 may communicate with a server network 74, and operating system 76. In some aspects, server network 74 is server 14 in FIG. 1A. In some aspects, operating system 76 executes computerized operations using a Microsoft Windows compatible operating system (OS), Apple OS X, Linux, iOS, Tizen, ANDROID, and the like.

In some aspects, ubicomp 12 applications are stored and managed on server 74. In some aspects, data server 74 is server 16. In some examples, server 74 is a cloud based and/or edge computing server architecture. In some aspects, computer applications 78 are coupled to server 74 and are connected to ubicomp 12 components via API 24. In some aspects, ubicomp 12 may operate with one or more computer applications 78 for processing, storing, analyzing, interpreting and converting ubicomp 12 and system 10 data into the aforementioned engagement data 80. In some aspects, engagement data 80 is stored in a dataset repository 84. In some aspects, dataset repository 84 is stored on computing device 26. In some aspects computer application 78 may refer to a single computer program or combination of multiple programs configured for a specific task, function, process or operation. In some aspects computer application 78 may refer to a neural network program in a specific configuration including but not limited to artificial intelligence, machine learning, or deep learning and the like. In some examples, computer application 78 is recommendation engine 18. In other examples, computer application 78 is inference intelligence 20. In further examples, engagement data 80 is formatted with blockchain encryption techniques by blockchain module 22. In some aspects, computer applications 78 may execute programs such as data analysis, data feature attribute computations, assign data classifications, and determine a value metric for an engagement data 80 record with applications such as linear classifiers, support vector machines, decision trees, Hidden Markov Model, Gaussian Mixture Model, Deep Neural Networks, Convolutional Network, Recursive Neural Network and the like.

Figure 1C:
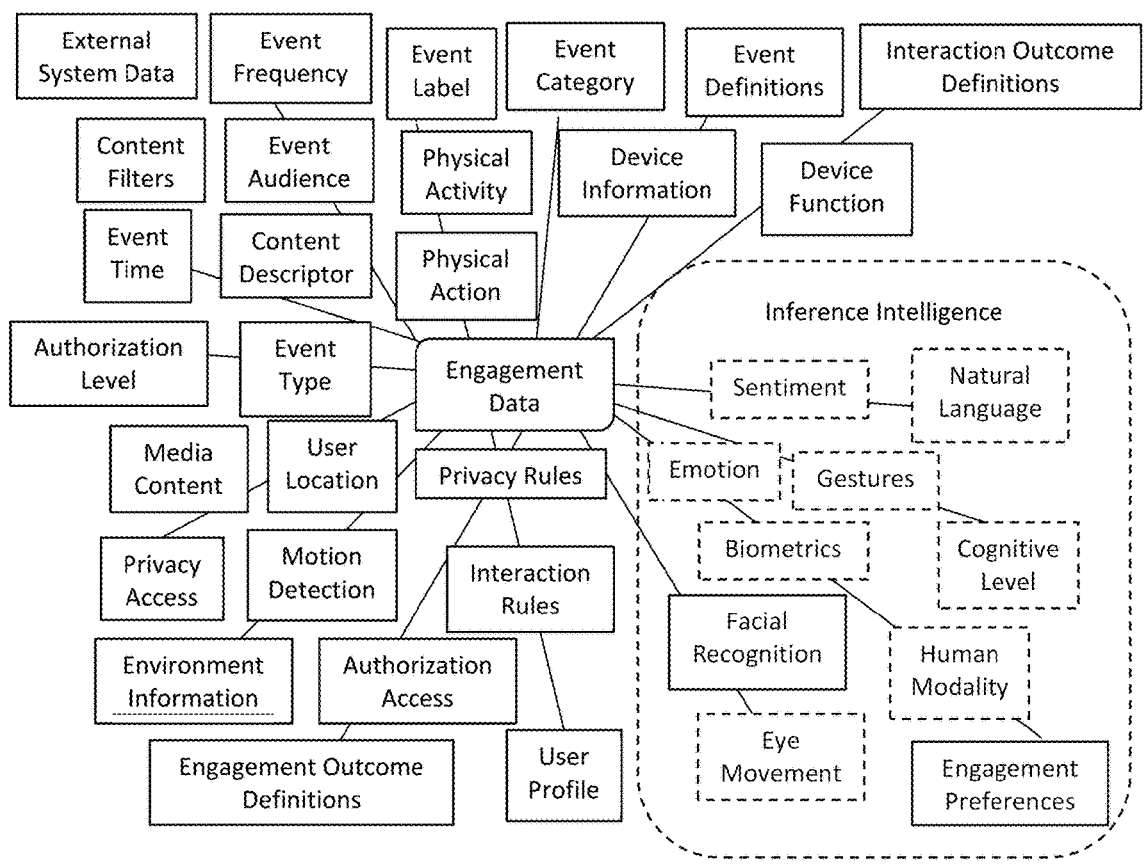
FIG. 1C illustrates exemplary engagement data categories generated from a subject's activity and experiences within a ubiquitous computing environment and with remote associated users according to an aspect of the present disclosure.
Figure 1D:
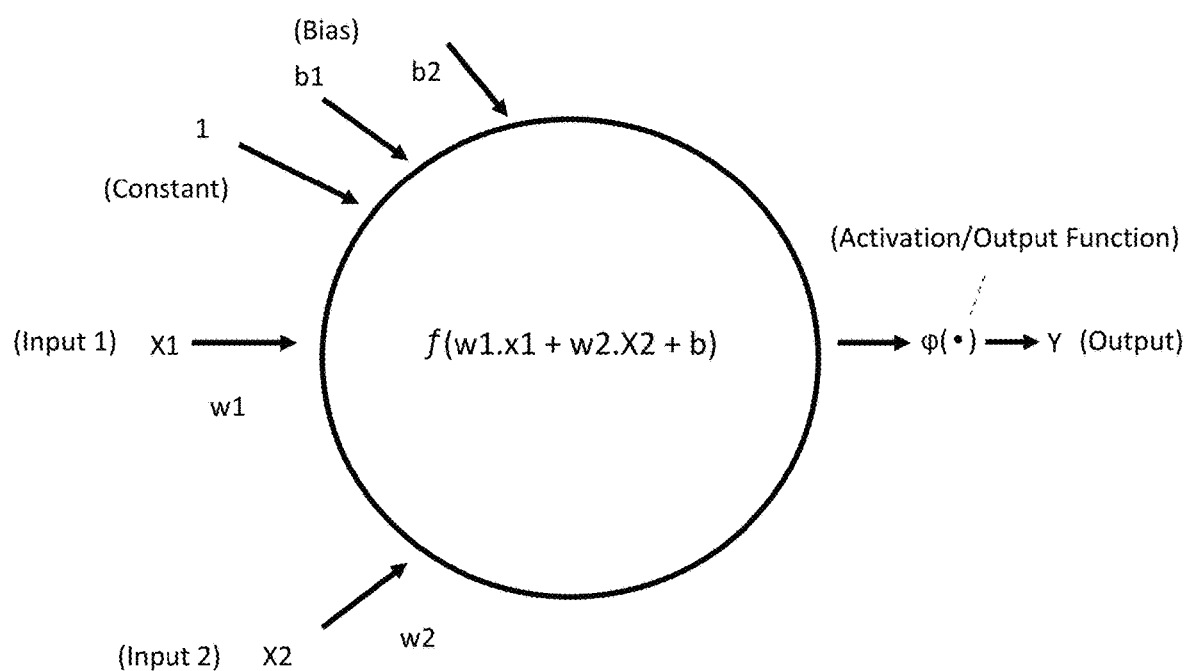
FIG. 1D illustrates an exemplary engagement data neural node generated from ubiquitous computing environment user activity according to an aspect of the present disclosure.

In some aspects, computer applications 78 may parse or separate engagement data 80 into various categories of training data 82 for reference, comparison, labeling, assigning classifications, features, attributes, and etc. In some aspects, training data 82 is stored on data repository 84. Training data 82 features and attributes may include labels, names, metadata identifiers, standards, values, scores, formats, categories and subcategories presented, as individual and interrelated data and/or datasets, by example and not limited to, data classes named in FIG. 1C. Notwithstanding the innovation design and performance objectives of system 10 and related components, engagement data 80 can be generated for an unlimited number of activity related scenarios such as identifying unique users, user preferences for activities, data activity conditions, schedule related activities, activity thresholds, precursors or triggers for executing operations, ranking and rating activity interests, anticipating activity outcomes, and predicting activities. To reduce the scope and focus of required data and computation efficiency, computer applications 78 may generate customized data profiles for engagement data 80 and training data 82 associated with specific users, including generic and anonymized user activity data from ubicomp 12. Where data feature attributes have been calculated for respective engagement datasets 80, computer application 78 may create customized engagement data 80 profiles by applying combinatorial equations for neural network applications that assign a weight or bias parameters to feature attributes, with values that either promote or demote the weight or bias assigned to the respective feature attribute 86 as represented in FIG. 1D. These feature attributes and values represent inference intelligence 20 used by system 10 and related components. With attribute values or "inference" calculated to identify, measure and compare user preference data associated with engagement data 80 events, computer application 78 comparative and predictive analysis programs may rate and rank experiences that may be alike or dissimilar. Using weights and biases, various computer applications 78 may apply computational analytics programming including but not limited to artificial intelligence, machine learning and deep learning, to newly presented system 10 activity data to determine correlations with and relevancy to an assigned engagement data 80 and training data 82 class that reduces calculation errors and computational requirements while improving overall data integrity, validity, reliability, and usability. In some aspects, computer application 78 may format engagement data 80 and training data 82 based on a file type, operating system, label, variable, value, feature, attribute, database type, and the like. In some aspects, computer application 78 may "clean" engagement data 80 and training data 82 by removing, correcting or adding data such as modifications based the desired solution focus, information sensitivity, filtering high frequency noise, data anonymization, and the like. In one example, computer application 78 may select a representative sample of collected data in efforts to more efficiently analyze a larger dataset.

Figure 1E:
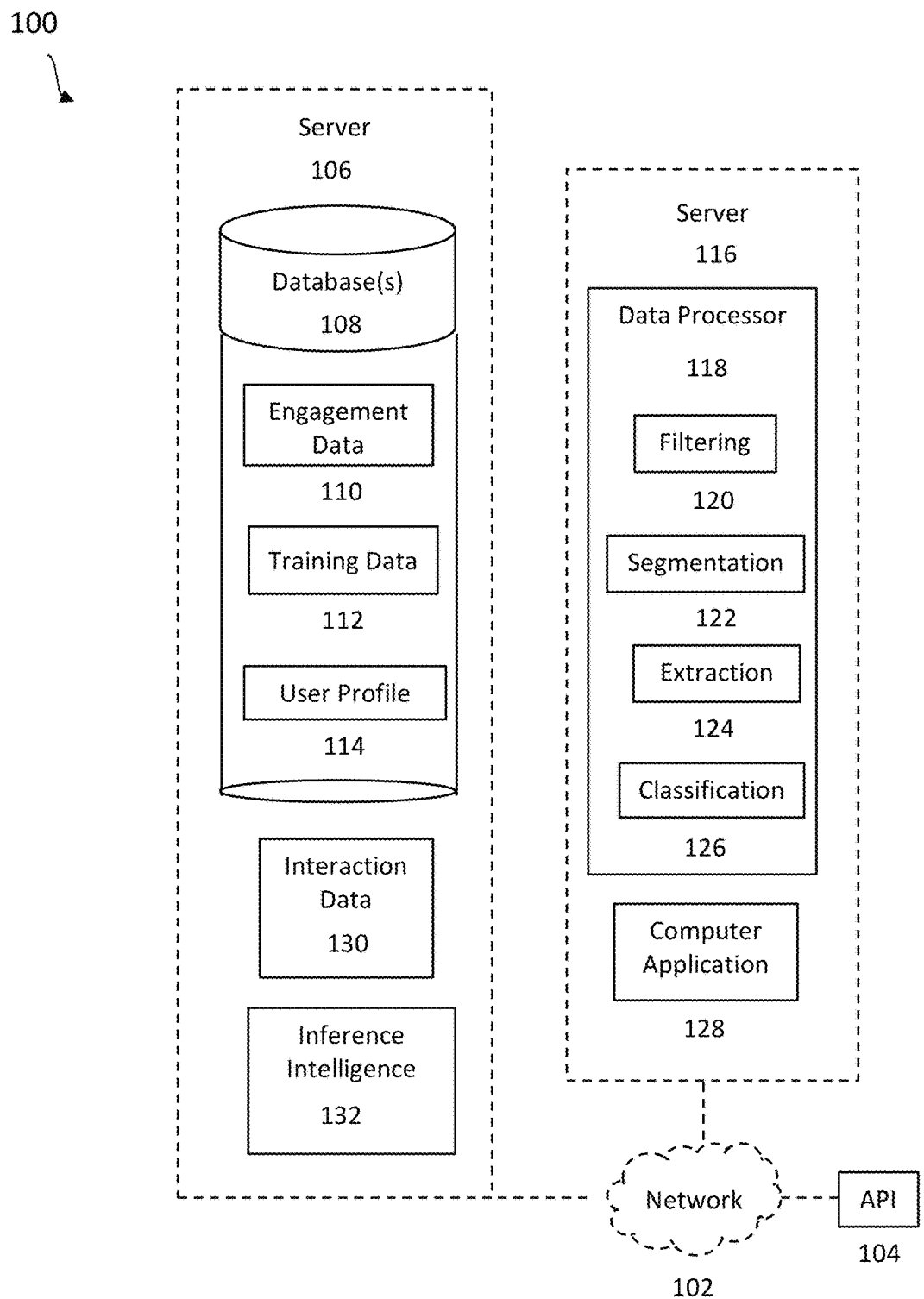
FIG. 1E illustrates an exemplary neural network model for generating engagement data and training data from ubiquitous computing environment user activity according to an aspect of the present disclosure.

FIG. 1E illustrates interaction recommendation engine 100, in accordance with some aspects of the present disclosure. Interaction recommendation engine or recommendation engine 100 operates to manage the physical and logical elements of system 10 by interpreting actions and rules that govern engagements and interactions between system 10 components and users of the system. For reference, recommendation engine 100 is disclosed herein for the purposes of presenting interaction recommendations based on identifiable engagement data 110 input from systems and methods that capture and present relevant data, including but not limited to, inputs such as human modalities, human actions and activities, physical environments, behavior, sentiments, lifestyle preferences, biometrics, user devices, networked communication devices, networked appliances, media content, external systems, platform systems, unique user profiles, and the like. Generally, recommendation engine 100 collects engagement data 110 from ubicomp 12 including hardware and software, API 24, system 10 components, and users operating API 24 on computing device 26. In some aspects, recommendation engine 100 generates two key datasets. First, from collected engagement data 110, recommendation engine 100 implements computerized process and analysis steps to determine a dataset of information or interaction data 130 that represents a known or desired human activity or behavior. For clarification, interaction data 130 is parsed from engagement data 110 assigned to user profile accounts for each unique subject and/or associated system 10 user based on their respective interactions. Second, from collected engagement data 110, recommendation engine 100 implements computerized process and analysis steps to determine a dataset of information or inference intelligence 132 that correlates preference or contextual information to interaction datasets 130 assigned to basic user activity within ubicomp 12, user interactions with specific ubicomp 12 components, interactions between users, and interactions between users and external services. For example, recommendation engine 100 detects and identifies a set of human actions and gestures that are assigned an interaction data 130 labeled "late night beverage" where the subject is observed with a networked camera in a kitchen opening a refrigerator and pouring a beverage in a glass during certain hours of the evening. A camera observing this interaction repeatedly may use object and label recognition to determine the type of drink and brand most often chosen by the subject and extract inference intelligence 132 associated with this specific user interaction dataset 130. In some aspects, inference intelligence 132 is inference intelligence 20. Using networked smart refrigerator inventory management technology, the recommendation engine 100 can alert the subject, other users, automated grocery list applications, and relevant external services to replenish the subject's preferred choice of late night beverages.

In some aspects, recommendation engine 100 may include network 102, API 104, database server 106 database 108, processor server 116, data processor 118, and computer application 128. Network 102 facilitates data transfers, exchanges and communication connections between recommendation engine 100, API 104 and system 10 components. In some aspects, network 102 is network 74 and network 14. Database server 106 may be coupled to network 102, API 104, and processor server 116 and in addition to providing selected data, communications and information access to ubicomp 12, computing device 26 and external system 28. In some aspects, server 106 is a comprised of a server network. In other aspects, server 106 is a comprised of an edge computing server architecture network. In some aspects, server 106 is an independent host, gateway and network access within system 10 for recommendation engine 100. In some aspects, server 106 is server 16. Database 108 may provide storage for data generated and supplied to system 10 components. In some aspects, database 108 is a comprised of a database network. In some aspects, database 108 is data repository 84. In some aspects, database 108 is a decentralized blockchain database. In some aspects, database 108 stores engagement data 110. In some aspects, engagement data 110 is engagement data 80. In some aspects, database 108 stores training data 112. In some aspects, training data 112 is training data 82. In some aspects, data processor 118 separates or parses information from engagement data inputs 110 or imports data via network 102 to be used as training data 112 with computer applications 128 perform algorithmic functions such as reference, comparison, recommendation, predictive, statistical analytics and the like. In some aspects, recommendation engine 100 may use a set of training data 112 for reference of or comparison to engagement data 110 class samples. In some examples, training data 112 may include descriptive information that defines the class sample features and attributes including labels, contextual data, preferences, data origin, and the like. In some aspects, database 108 stores user profile data 114. User profile data 114 may include a unique user identifier, user name, e-mail address, password, gender, age, race, address, occupation, publisher/consumer status, media device types, media device IP addresses, business information payment information, bank account information, shipping address, and contact information. User profile data 114 may also include user experience and historical user activity data such as lifestyle engagement routines, inference intelligence 132, platform activity, device activity, user interaction relationships and the like.

Data processor server 116 hosts computerized applications for recommendation engine 100 and provides gateway access to system 10 and related components. In some aspects, data processor server 116 is a comprised of a process server network. In other aspects, data processor server 116 is a comprised of an edge computing server architecture network. In some aspects, data processor server 116 is an independent host, gateway and network access within system 10 for recommendation engine 100. Data processor 118 may assign or use assigned labels, descriptors, data summaries, origination information, features, attributes and the like to process and identify the engagement data 110. In one example, data processor 118 collects, cleans, and prepares engagement data 110 in accordance with the various processing, formatting, indexing, labeling and related requirements that comprise recommendation engine 100 applications for generating interaction data 130 and inference intelligence 132. In some aspects, data processor 118 includes filtering application 120, segmentation application 122, extraction application 124 and classification application 126.

In some aspects, data processor 118 may use filtering application 120 to manage, import, and transfer engagement data 110. In some examples, filtering application 120 operations include sampling data, test data, creating training datasets, windowing, reducing high frequency noise and processing data for use by various computational applications that receive information from engagement data 110 inputs. In some examples, filtering application 120 executes operations such as Split Data, Clean Missing Data, Partition and Sample, Apply SQL Transformation, Clip Values, and the like. In some aspects, data processor 118 may use segmentation application 122 to separate engagement data 110 into distinct groups for artificial intelligence, machine learning and other analytic applications, data processes, signal mapping, and system related programs. Segmentation application 122 can create data segments using algorithmic clustering methods consisting of unsupervised, semi-supervised, and supervised categories with applied domain expertise. In some aspects, data processor 118 may use extraction application 124 to identify and characteristics of specific features and attributes related information from engagement data 110 inputs including but not limited to video signals, networked camera feeds, image recognition, facial recognition, emotion recognition, object recognition, label recognition, gesture identification, activity labeling, natural language, speech to text, audible sounds, text, images, language, dates, and the like. To create a more informative dataset or representation of relevant features, extraction application 124 may transform and reclassify data input using descriptive and discriminatory feature sets. Extraction application 124 may include calculations for statistical and morphological characteristics of represented data. In some aspects, training data 112 may be imported by recommendation engine 100 into database 108 from network 102 source, such as generic information for comparison data usage, or generated by computer application 128 programs configured to extract and store training data from existing engagement data 110. Classification application 126 can compare newly introduced engagement data 110 to existing training data 112 using unsupervised, semi-supervised, and supervised methods to determine information that newly presented data should have to represent engagement data 110, training data 112, and interaction data 130. In some examples, classification application 126 executes algorithmic techniques and operations such as k-Nearest Neighbors, Linear Discriminant Analysis, Naive Bayes Classifier, Logistic Regression, Support Vector Machines, Decision Trees, Boosted Trees, Random Forest, Neural Networks, Nearest Neighbor and the like. In some aspects, data processor 118 may use multiple classification applications 126 to improve classification accuracy. Classification application 126 may make classifications that include but are not limited to engagement instances and outcomes measured by data values, data parameters and conditions; identifying optimal and non-optical engagement measured by data values, data parameters and conditions; predicting qualitative and qualitative engagement measured by data values, data parameters, and conditions; and optimal interaction conditions and or parameters associated with respective user and system activities; identifying inference intelligence from event conditions, participants, moods, biometrics, emotions, sentiment, gestures, language, cognitive information, modality, activity frequency and similar value or scored information that can be compared, ranked and rated. The measured values, unique engagement conditions, qualitative and qualitative aspects of an interaction will vary based on the subjective experiences of subjects with the system, system components, and other users. At a given instance of engagement conditions or parameters, defined by interaction data 130, a user may be the focal point or "subject" where engagement recommendation inference intelligence 132 qualifies the nature or value of the interaction based on that individual's preferences, empirical profile data, contextual data, and the like. Inference intelligence 132 is reference information, unique to each user, and is refined with each additional interaction that can be used to compare and validate the measurements attributed to individual users from empirical data as well as predictions of future engagement opportunities, whether objectively favorable or not based on known information. For reference purposes, engagement data 110 and datasets are captured, processed and stored by system 10 components in anticipation of the innovations described herein applying various computational, artificial intelligence, machine learning, deep learning and predictive analytical techniques to identify obvious and non-obvious aspects of measurable human activity and behavior that qualify as interaction data 130 based on the subjective experiences and desires of users. Collected engagement data 110 may have value upon initial introduction to recommendation engine 100, a cumulative impact as addition information and context is applied, or more relevance as archived data that assists various applications which utilize time based information.

Figure 1F:
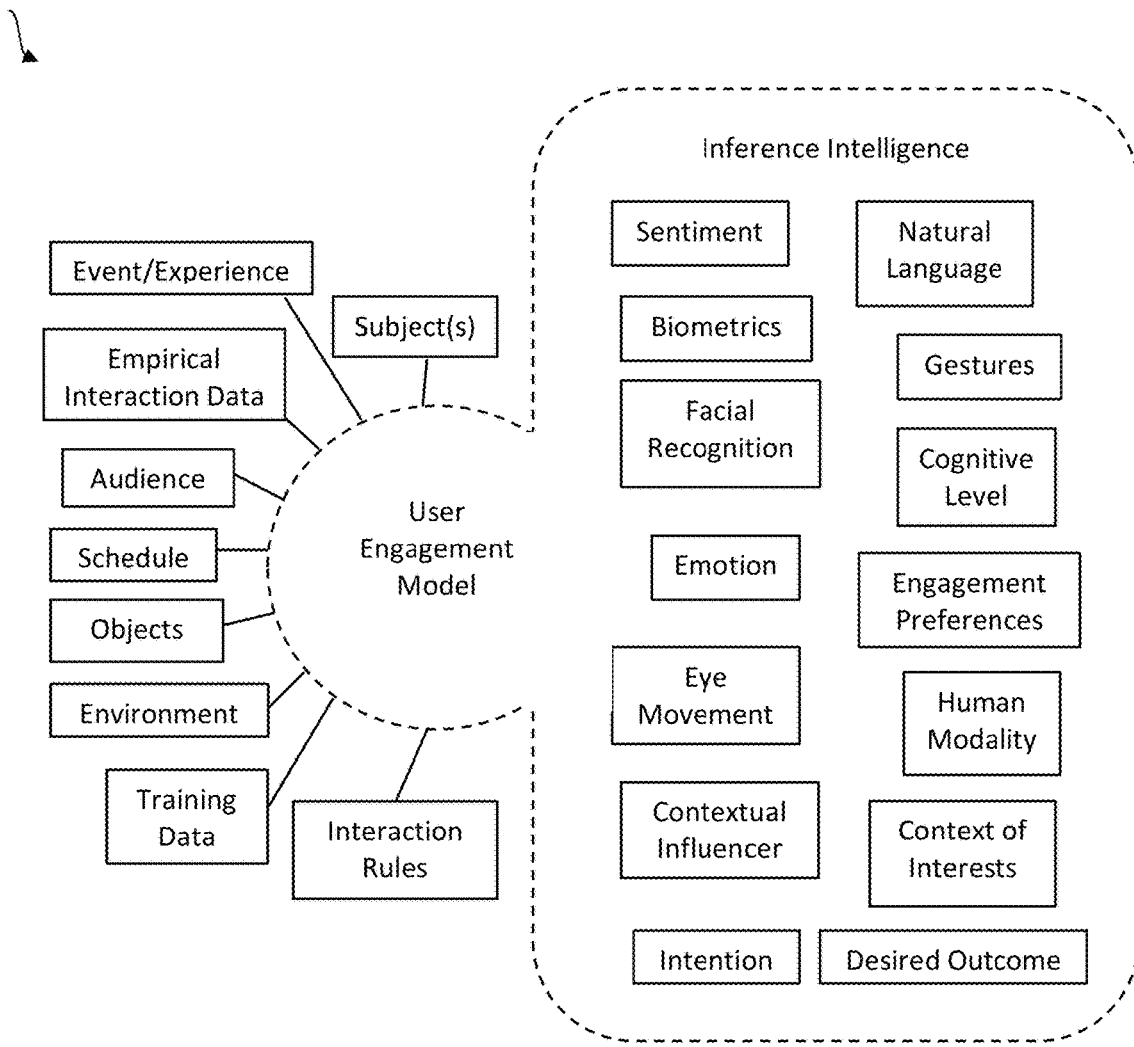
FIG. 1F illustrates exemplary data elements including customized user engagement models according to an aspect of the present disclosure.

In some aspects, one or more computer application 128 are components of recommendation engine 100. In some examples, recommendation engine 100 executes machine learning programs with algorithms and neural network architectures to improve classification and prediction accuracy using analytic and learning model configurations. In some aspects, computer application 128 is computer applications 78. In one example, computer application 128 is configured as a learning module where software is programmed to associate, correlate, analyze, compare, extrapolate and validate engagement data 110 with training data 112. In one example, this learning module computer application 128 may use a multimodal mathematical model to execute operations including, but not limited to, statistics, probabilities, correlations, data maps, model deployment, testing, fine tuning, training, visual recognition, rectification, and pooling using deep learning frameworks such as OverFeat, Theano/Pylearn, Torch7, Dec, cuda-covnet, Caffe and the like. In some aspects, engagement data 110 is collected and labeled from inputs based on each class of user and system activities that needs to be recognized and matched with engagement data 110 for one of a plurality of predefined classes of user and system activities and events associated with corresponding engagement data 110. In some aspects, where engagement data 110 associated with activity or events are previously unknown, recommendation engine 100 may use learning module computer application 128 to compare features and attributes of unknown user and system engagement data 110 with features and attributes of stored training data 112. Learning module computer application 128, where applicable to user interactions with other users or the system, may adapt existing training data 112 to establish inference intelligence 132 that is recorded and stored as user profile data 114, creating a unique engagement data 110 model for a specific interaction dataset 130. As depicted in FIG. 1F, a model may be used by recommendation engine 100 to efficiently identify engagement data 110 conditions and user profile data 114 preferences for a given interaction dataset 130, based on inference intelligence 132 (i.e.; favorable or optimal desired outcomes) and provide appropriate parties with accurate and timely notifications if desired. Recommendation engine 100 may use learning module computer application 128 to test an engagement model by comparing similar user data empirical data generated that may be reliable predictor of future interaction outcomes of a similar nature.

In another example, computer application 128 is configured as a contextual agent where software is programmed to identify, associate, analyze, compare, extrapolate and interpret inference intelligence 132 generated form engagement data 110 and interaction data 130. In some aspects, contextual agent computer application 128 may be configured to assign weights and biases, describe previously in FIG. 1D, associated with engagement data 110 and interaction data to that are applied to various computer application 128 processes and calculations (neural networks, algorithms, programs) that produce reliable and accurate inference intelligence 132 for use by recommendation engine 100. In some aspects, contextual agent computer application 128 may identify factors, variables, conditions or circumstances evidenced with analysis of engagement data 110, user profile data 114 and interaction data 130 that influence various user activities, intentions, expectations, and interaction outcomes that can be introduced by recommendation engine 100 to improve interpretability of engagement data 110, interaction data 130, and ultimately optimize performance of algorithmic, computational, and predictive analytics programs by storing data insights as empirical user data or training data 112 for reference. Based on the data presented to recommendation engine 100, contextual agent computer application 128 may add to, delete, modify, or enhance engagement data 110 and interaction data 130 features and attributes using weights and biases for each data class, respectively, and create new data classes for inference intelligence 132 as needed. In some aspects, contextual agent computer application 128 solicits feedback from a user operating API 24 on computing device 36. Feedback may include but is not limited to device information such as location, text messaging, data exchanges, camera data, API 24 activity, and the like.

In some aspects, contextual agent computer application 128 may operate in conjunction with learning module computer application 128 to train data analysis models, fine-tune models for optimal performance, reduce analytic errors, identify bias, generalization, and the like. In some aspects, where previously unknown data input is presented, the contextual agent computer application 128 and learning module computer application 128 may operate to solicit feedback from system 10 users to confirm and validate newly presented engagement data 110, interaction data 130 or training data 112 from unknown data using reference information from external sources such as the internet, external services 28, the subject(s) of the data being compared, and associated users of said subject(s) via automated notification, requests for information, surveys, and the like.

In a further example, computer application 128 is configured as a recommendation module where software is programmed to compile, process, and analyze interaction data 130 and inference intelligence 132 to interpret, evaluate and anticipate outcomes that guide recommendation selections for favorable, unfavorable or neutral user interactions. An interaction recommendation selection can be defined as a single or collection of user choices of actions and decisions, based on analyzed interaction data 130 and inference intelligence 132, that may be presented as ranked and/or rated lists based on favorable outcome, user intentions, circumstantial actions based on a data instance, scheduled or time based decisions, and responses to direct communications between user devices such as an electronic request for information on a smart device. With each opportunity for user engagement, recommendation module computer application 128 may define engagement data 110 classes for each unique user, adding greater context and refinements that improve predictive analysis of interaction outcomes and subsequent recommendations to users. For example, if a subject is presented a specific media content type with varying engagement measurements for each respective media exposure event, recommendation module computer application 128 may use training 114 and engagement data 110 to provide a more accurate understanding of the variance in engagement measurements (defined by rules, weights and biases) that enable more concise ranking and rating of interaction recommendations of, for example, user preference priority for media genre or artist, who should present the media, when to present the media, what environmental conditions are ideal, what technical means is optimal, how long the media presentation should last, how often should the media be presented, what alternative media choices are comparable, and etc. More specific, if a subject enjoys viewing images of yellow roses on a tablet device at noon while eating lunch alone on weekdays (and not weekends), the recommendation module will identify interaction data 130 including all measurable user data, environmental conditions, preferences, and etc. by class such as, in the present example (frequency: once a day; subject: yellow roses; method: tablet device; activity: lunch; behavior: alone; schedule; only weekdays at noon) to create recommendations for interactions that are presented to the subject and/or the subject's associated users to guide their decisions and actions. Electronically, with a push notification of the aforementioned interaction description, either by designated schedule settings or an impromptu instance when the components of the optimal conditions are detected by recommendation engine 100, the subject's associated users can have reminders of each respective interaction element that comprises an optimal engagement which in turn empowers them to create the prescribed conditions for the subject, i.e.—order delivery of lunch at the designated time, find suitable images based on the subject's tastes, deliver images to the subject's tablet device, and send a reminder to other users to respect the subject's privacy during the activity. Interaction recommendations can be created for the subject where, based on scheduled or impromptu detection of optimal conditions, recommendation module computer application 128 can deliver interaction recommendations via API 24 to a subject's computing device 26 or ubicomp user interface 70 within ubicomp 12 and associated user devices 26 located outside ubicomp 12. For example, based on empirical and training data, system 10 can identify voice commands, physical gestures and actions, behaviors, habits and patterns that anticipate a subject's lifestyle preferences with recommendations such as suggestions of favorite television program viewing times; availability of favorite user associates via networked devices 26; schedule for house cleaning, building maintenance, personal caregiving, interactions with an object or networked appliance; transportation or meals from external services 28; advanced lead time for personal grooming routines; social visitation schedule, meal delivery lead time, transport schedule and etc. In some aspects, recommendation module computer application 128 may use a data identifier that recognizes patterns, trends, routines and habits associated with interaction datasets 130 to be used by recommendation engine 100 as benchmarks, thresholds, precursor, triggers and the like that predict or anticipate user activity or behaviors that precede or follow an interaction with ubicomp 12, system 10 components, API 24, or users operating computing device 26.

Figure 2:
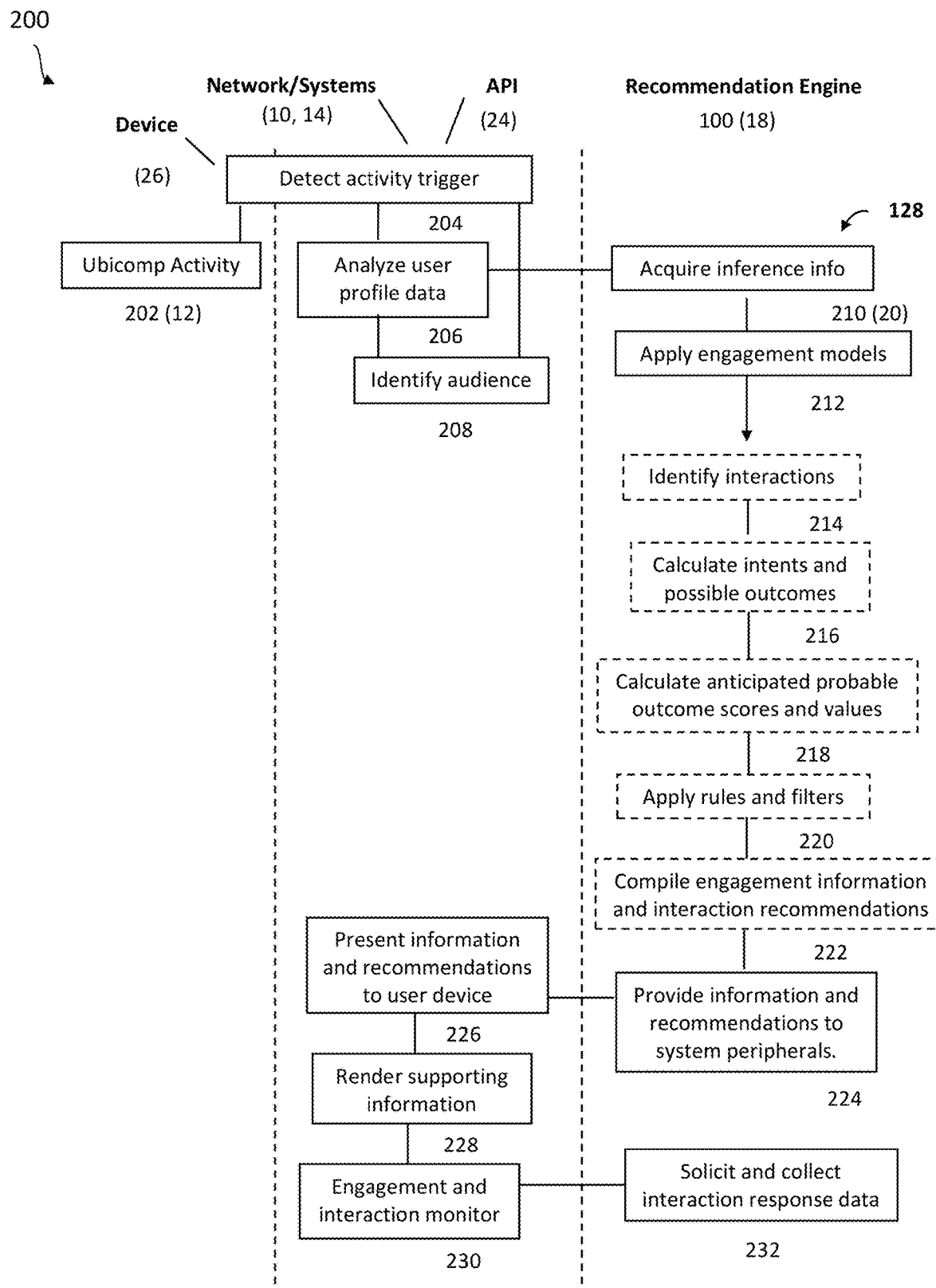
FIG. 2 illustrates a block diagram of a process for delivering interaction recommendations to engagement platform users according to an aspect of the present disclosure.

Referring to FIG. 2, a flow diagram is depicted illustrating an example of a process 200 for one or more aspects of delivering interaction recommendations to users according to some implementations of the disclosure. In some aspects, the process begins at step 202 with engagement related activity associated with interactions in a ubiquitous computing environment 12. Engagement may include activity of a subject within a ubicomp; activity between a subject and ubicomp components; activity between a subject and associated users either within a ubicomp or remotely located; and activity between associated users of a subject and ubicomp components, either located within the ubicomp or remotely located.

In some aspects, activity in step 202 may be represented in various forms of engagement data 110 including but not limited to physical movement, gestures, walking, audible sounds, speech, voice commands, haptic control motion, facial expressions, moods, biometrics; automated or remotely controlled operations by system 10, network 14, external systems 28 and/or remotely networked devices 26; and user engagement via API 22, ubicomp 12 components, network 14, or external systems 28. At step 204, process 200 detects activity using a trigger comprised of a computational model for capturing, measuring, analyzing, and interpreting engagement data 110 information related to an event, sequence, threshold, benchmark, user action, user profile, or operations associated with a device, program, network, system and labels the associated data as interaction data 130. At step 206, process 200 associates the detected activity with a subject (or subjects) then, in step 208, process 200 identifies and audience of prospective associated users 208. A prospective audience member may be identified with automated operations using specific thresholds of or predetermined user profile information 114, current or previous status, communication with API 24 or networked device 26. Members of audience 208 may be included or excluded in process 200 based on filters such as activity category, authority level, permissions, subject matter relevancy, interaction availability, correlations or comparisons of user profile data of the subject and the respective associated users, or similar parameters.

At step 210, process 200 collects inference intelligence 132 from recommendation engine 100 and computer application 128. Inference intelligence 132 may be indicative of current activities and historical activities associated with the subject, audience, or unique engagement data 110 conditions recognized by trigger 204. In some aspects, a benchmark or threshold level reference file is established, labeled, and stored with user profile data 114 based on the available, triggered, extrapolated and interpreted data conditions, for future use by system 10 and recommendation engine 100. At step 212, process 200 generates a computational model using activity data 202, trigger data 204, user profile information 206, audience data 208, and inference intelligence 210. In step 214, process 200, using the model, determines possible interactions for the subject and audience members. In step 216, process 200, using the model, calculates and assigns a data value to user intentions and possible interaction outcomes by integrating activity data 202, subject/audience user profile information 206 and inference intelligence 132 with computational model 212. In step 218, process 200, using the model, calculates outcome scores and values based on the probability of anticipated outcomes and intentions for each participant of the possible interactions and ranks the possible outcomes to determine plausible interaction recommendations in favorable, unfavorable and neutral categories. In step 220, process 200, using the model, applies subject and audience member interaction rules and filters that may include or exclude interaction recommendation distribution based on preset parameters from the identification step 208 or newly established conditions based on calculations of inclusion or exclusion based on activity category, authority level, permissions, subject matter relevancy, interaction availability, and the like. In step 222, process 200, using the model, creates a record of the engagement conditions including calendar time stamp, category, type, unique identifier labels, related scores and values of possible interaction recommendations, interaction instructions for respective participants, reminder schedule, and user distribution list. Process 200, using the model, compiles the engagement information and interaction recommendations data records for distribution to respective users in the form of communication language such as alphanumeric characters, symbols, audible signals, or other executable commands. In step 224, based on the preset methods of communication associated with a user's profile information 206, process 200 prepares engagement information and interaction recommendations for distribution to system peripherals 10, API 24, computing devices 26, external networks 28, and other ubicomp 12 components in forms and styles consistent with the recipients preferred method.

Similarly, in step 226, process 200 delivers engagement information and interaction recommendations to system peripherals 10, user devices 26, external networks 28, and other ubicomp 12 components on a schedule and sequence with the recipients preferred method of receiving information. In some examples, a recipient may reject one or all presented interaction recommendations, thus creating new rule and filter information and new inference intelligence 132, upon which process 200 returns to step 210. In step 228, upon a user executable function or automated command control, process 200 may provide additional information about the current engagement or interaction recommendations such as engagement and outcome historical data for the current subject and engagement matter, graphs and charts of interaction data analytics of the subject, rated and ranked recommendations based on aggregated data from related local, national, anonymized and/or demographic statistical data. In step 230, process 200, upon a user executable function or automated command control, will generate a computational model to track, analyze and compare expected engagement conditions with anticipated interaction outcomes based on known data (202, 204, 206, 208, 210) using probability calculations that, based on changes in benchmark or threshold values for the known data, will cause process 200 to recalculate the interaction recommendations starting with step 202. In this step, process 200, upon a user executable function or automated command control, creates a new contextual data record 210 to be used by process 200 and associated with a user profile information 206 and unique engagement conditions 204.

In step 232, process 200, based on the time assigned for the desired interaction, will solicit feedback data from participants to confirm both the interaction and outcome status. Feedback may be solicited in various formats using automated programs or notifications to user devices to communicate directly with the subject and/or associated users regarding the engagement subject matter. Response data verification may be initiated with a user executable function or automated command control, where a user is presented with various methods of communicating interaction outcome responses such as voice-enabled questions presented on a communications device, electronic questions delivered to a communications device, audible sounds, haptic gestures, facial expressions, eye movements, and the like.

Figure 3A:
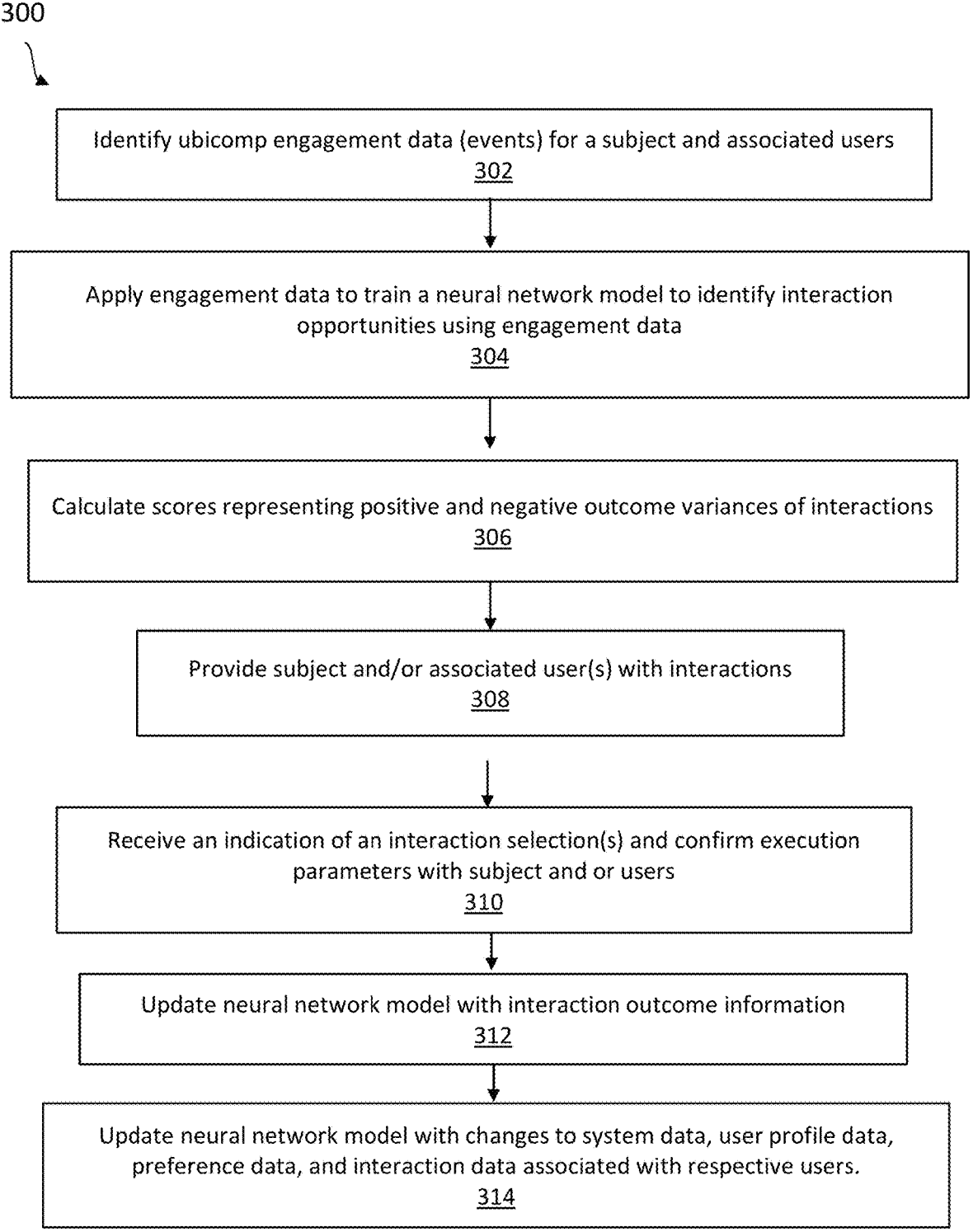
FIG. 3A illustrates a flow diagram for determining an interaction opportunity with a subject within a ubiquitous computing environment according to an aspect of the present disclosure.

Referring to FIG. 3A, a flow diagram is depicted illustrating a system or method 300 for determining an interaction opportunity for a subject within a ubiquitous computing environment, according to an implementation of the disclosure. System or method 300 may be performed by processing logic that comprises hardware, software, or a combination thereof. In some aspects, system or method 300 may be performed by recommendation engine 100 coupled to ubicomp 12. In some aspects, a subject and/or associated users interact with ubicomp 12 remotely via API 24. At block 302, processing logic determines that engagement activity has been detected within ubicomp 12 from a user, networked device 26, system operation or from a remote source, such as a networked device 26, program stored on network 14, server 16, or external system 28. To further the example, an engagement data 110 event may be identified, labeled and cataloged where a pre-defined threshold, benchmark, or parameter is reached based on detected data and associated reference data from user profile information, training data, and the like to define an interaction dataset 130. In some aspects, an engagement data 110 event or a combination of sequence or series of engagement data 110 events may comprise a single interaction or multiple interactions. In some aspects, an interaction may be identified with a label, unique identifier, category, name, and the like with an automated means or by user input.

At block 304, processing logic uses the ubicomp engagement data 110 to train a neural network computational model to determine possible interaction opportunities involving the subject, associated users, system program applications, system devices, or combination therein. In some aspects, the possible interactions are determined using algorithms that calculate available and/or referenced engagement datasets 110. In some aspects, available and referenced datasets may include, but not be limited to, interaction type, method, rules, access permissions, schedule, privacy settings, user preferences, user status, contextual data and the like. In some aspects, inference intelligence 132 for respective datasets may determine applicability, bias, or weighted value used by the algorithm applications. At block 306, processing logic calculates scores for indicators of positive or negative interaction outcomes. In some aspects, indicators are calculated using user profile data, historical interaction 130 reference data, generic training data, user preference data, and inference related information. At block 308, processing logic originates a list of recommendations for interactions. In some aspects, the list is ranked where recommendations are associated with a score or value based on user preferences, user status, schedule, or other interaction related dataset in ranked or rated lists according to favorability, unfavourability or neutrality. In some aspects, the recommendations are associated with interaction conditions or standards that clarify or qualify terms and/or requirements of a prospective interaction that identifies a single or range that may be considered optimal or acceptable based on available data. To further the example above, a recommendation to visit a subject by associated users may include conditions of day, time, permitted or non-permitted individuals, and the like. At block 310, processing logic receives an interaction confirmation from relevant parties including subject matter, method, schedule, location, terms or requirements, and prospective participants. In some aspects, the interaction confirmation information is presented based on parameters set based on user profile data or pre-set conditional data managed by the system. At block 312, the neural network computational model is updated with interaction outcome data. At block 314, the neural network computational model is updated with changes to system data, user profile data, preference data, and interaction data associated with respective users. In some aspects, the process of the system or method 300 can continue to any of blocks 302, 303, 306, 308, 310, 312, or 314.

Figure 3B:
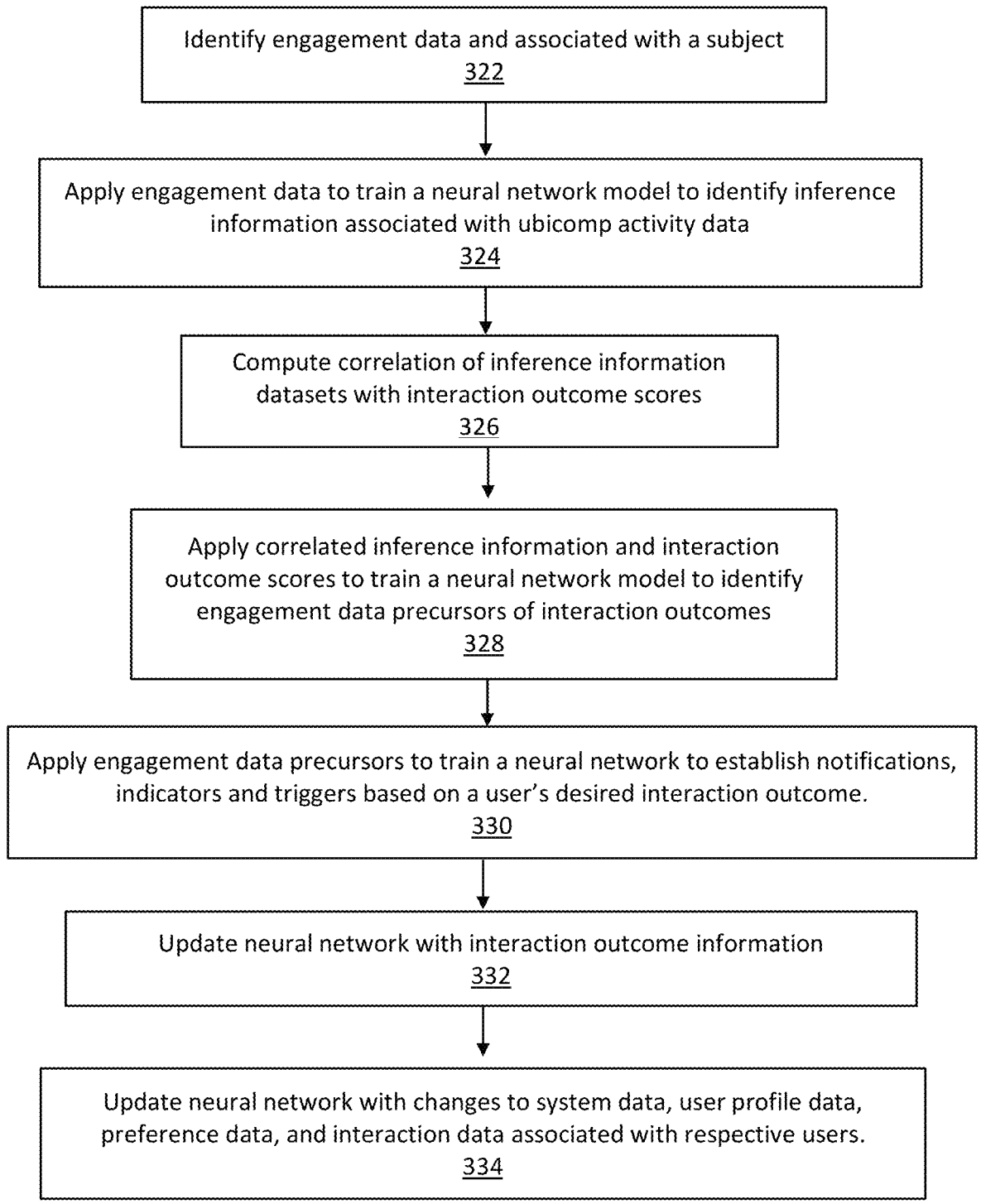
FIG. 3B illustrates a flow diagram for determining interaction contextual information for a subject associated with a ubiquitous computing environment according to an aspect of the present disclosure.

Referring to FIG. 3B, a flow diagram is depicted illustrating a system or method 320 for determining interaction inference intelligence 132 for a subject associated with a ubiquitous computing environment, according to an implementation of the disclosure. System or method 320 may be performed by processing logic that comprises hardware, software, or a combination thereof. In some aspects, system or method 320 may be performed by recommendation engine 100 coupled to ubicomp 12. At block 322, processing logic identifies engagement data 110 events and interactions 130 associated with a subject. In some aspects, a subject and/or associated user may interact with ubicomp 12 and one another from within ubicomp 12 while in other aspects a subject may be physically in remote location while interacting with ubicomp 12 and associated users. At block 324, processing logic applies engagement data 110 events and interactions 130 to train a neural network model to identify inference intelligence 132 information. In some aspects, inference intelligence 132 may include data derived from a subject, a subject's associated users, system program applications, system devices, or combination therein. In some aspects, the inference intelligence may be calculated using individual datasets or a combination therein including but not limited to environmental data, experiential data, user profile data, user preference data, historical data, and generic training data. In some aspects, the relevancy of the identified engagement data 110 is a calculated value, used as weights and biases, based on individual or multiple datasets including real-time data, historical data of user profile and previous interactions, training data, and probability values related to user preference, intentions, desired outcomes, and the like. At block 326, processing logic calculates a score comparing inference intelligence with interaction outcome values 306. At block 328, processing logic applies correlated inference intelligence 132 and interaction outcome scores to train a neural network model to identify engagement data 110 precursors with interaction outcomes, which adds deeper contextual data to inference intelligence 132. In some aspects, the precursor or precursors may be a value, a data point, a data set or defined by parameters that establish a baseline, benchmark, threshold and the like. In some aspects, the precursor value calculation is based on a probability, an algorithm, an analytic program, and the like. In some aspects the precursors may be represented by a label, category, type, number, percentage, unique identifying code and the like. At block 330, processing logic applies engagement data 110 precursors to train a neural network model to establish notifications, indicators and triggers based on interaction outcomes desired by a user. In some aspects, notifications, indicators and triggers can be presented to users in various formats including alphanumeric, graph, line charts, percentage, ranked and rated lists, and the like. In some aspects, the notifications, indicators and triggers can be associated with interaction recommendations presented to users based on non-computational values such as category, type, schedule, attendees, content, method, device, and the like. At block 332, the neural network model is updated with engagement data 110 and precursor data. At block 334, the neural network model is updated with changes to system data, user profile data, preference data, and interaction data associated with respective users. In some aspects, the process of the system or method 320 can continue to any of blocks 322, 324, 326, 328, 330, 332, or 334.

Figure 3C:
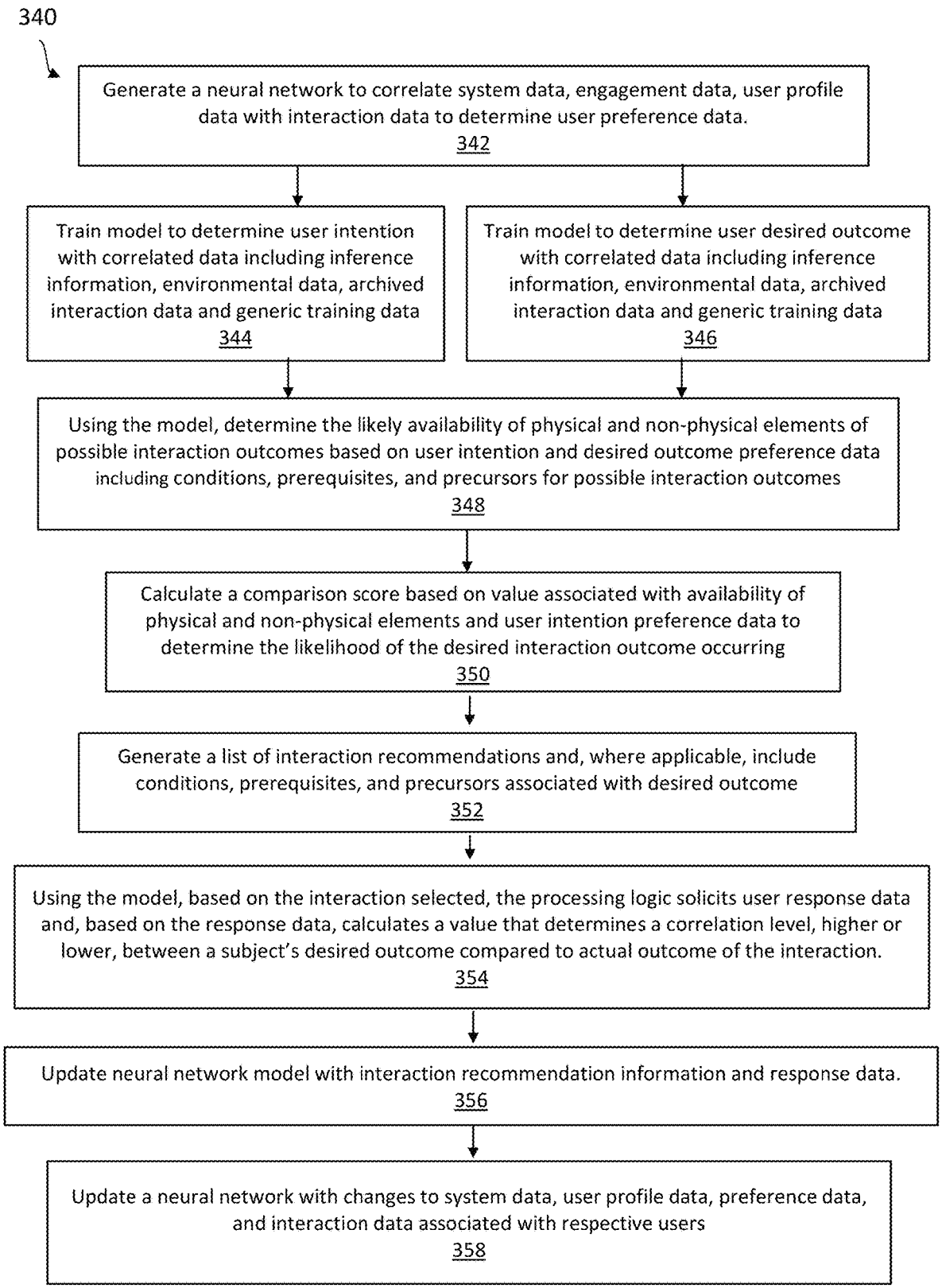
FIG. 3C illustrates a flow diagram for generating interaction recommendations using preference related data associated with a ubiquitous computing environment according to an aspect of the present disclosure.

Referring to FIG. 3C, a flow diagram is depicted illustrating system or method 340 for generating interaction recommendations using preference related data associated with a ubiquitous computing environment, according to an implementation of the disclosure. System or method 340 may be performed by processing logic that comprises hardware, software, or a combination thereof. In some aspects, system or method 340 may be performed by recommendation engine 100 coupled to API 24 and ubicomp 12. At block 342, the processing logic generates a neural network model using computer application 78 to correlate ubicomp 12 data, system data 10, engagement data 110, interaction data 130, inference intelligence 132, and user preference data 114. At block 344, using the neural network model, the processing logic trains the model to determine a user's intention with the above correlated data including real-time event inference information and environmental data, archived interaction data and generic training data. At block 346, using the neural network model, the processing logic to train model to determine a user's desired outcome with correlated data including real-time inference information information and environmental data, preference data, archived interaction data and generic training data. At block 348, using the neural network model, the processing logic determines the likely availability of physical and non-physical elements of possible interaction outcomes based on user intention and desired outcome preference data including conditions, prerequisites, and precursors for possible interaction outcomes. At block 350, the processing logic calculates a comparison score based on value associated with availability of physical and non-physical elements and user intention preference data to determine the likelihood of the desired interaction outcome occurring. At block 352, the processing logic generates a list of interaction recommendations and, where applicable, includes conditions, prerequisites, and precursors associated with desired outcome. At block 354, using the neural network model, based on the interaction selected, the processing logic solicits user response data and, based on the response data, calculates a value that determines a correlation level, higher or lower, between a subject's desired outcome compared to actual outcome of the interaction. In some aspects, the processing logic solicits user response data feedback from various sources including but not limited to device data, biometric data, audible surveys, electronic surveys, subject centric information, a subject's associated user centric information, text based communications, inference intelligence 132 and system 10 data. At block 356, the neural network model is updated with interaction recommendation information. At block 358, the neural network model is updated with changes to system data, user profile data, preference data, and interaction data associated with respective users. In some aspects, the process of the system or method 340 can continue to any of blocks 342, 344, 346, 348, 350, 352, 354, 356 or 358.

Figure 3D:
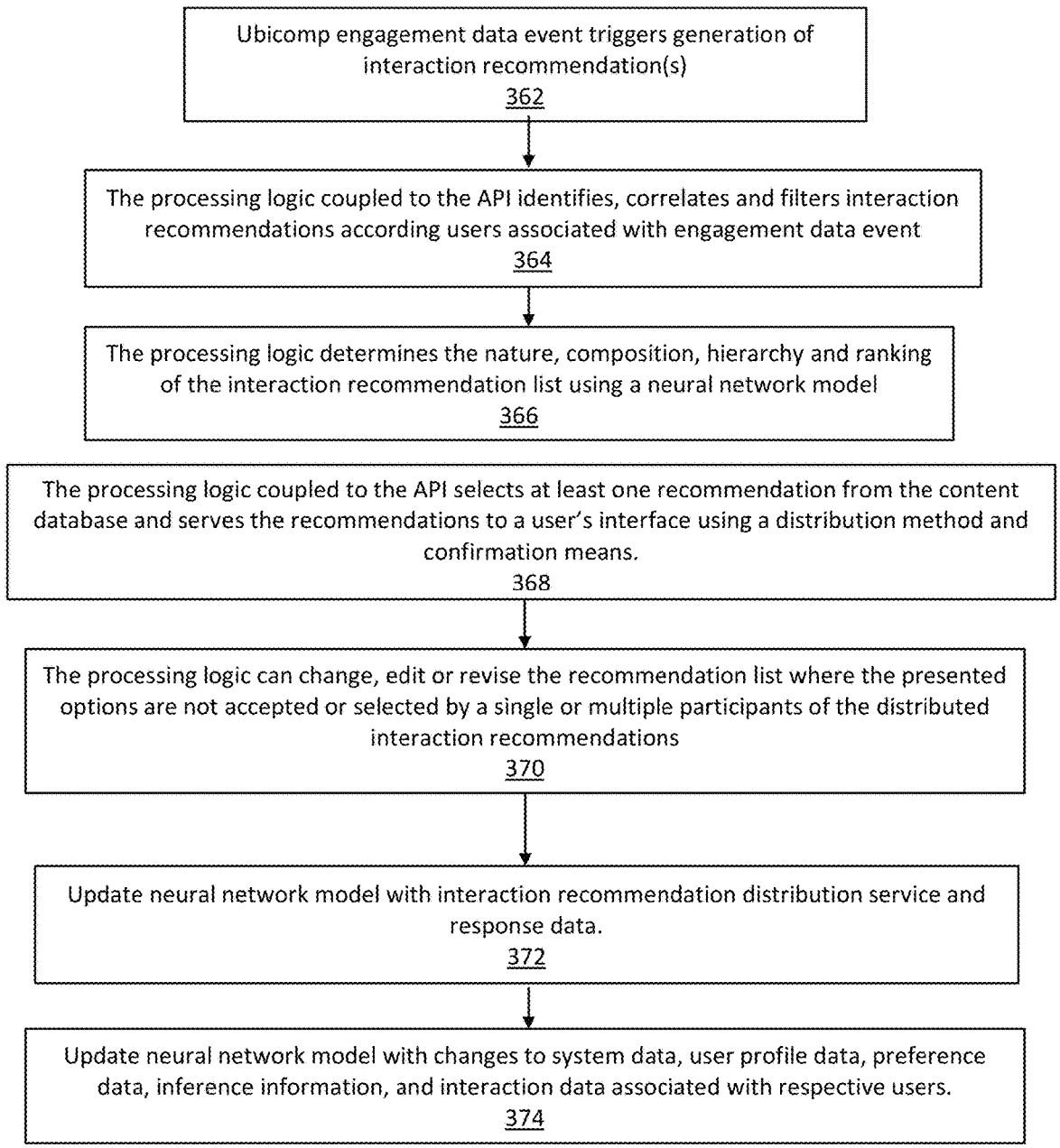
FIG. 3D illustrates a flow diagram for managing interaction recommendations using interaction data associated with a ubiquitous computing environment according to an aspect of the present disclosure.

Referring to FIG. 3D, a flow diagram is depicted illustrating a system or method 360 for managing interaction recommendations using interaction data associated with a ubiquitous computing environment, according to an implementation of the disclosure. System or method 360 may be performed by processing logic that comprises hardware, software, or a combination thereof. In some aspects, system or method 360 may be performed by recommendation engine 100 coupled to ubicomp 12, server 116, API 24 and user profile data 114 stored on database 108. At block 362, ubicomp engagement data event triggers generation of interaction recommendation(s). At block 364, the processing logic coupled to API 24 identifies, correlates and filters interaction recommendations according users associated with a defined interaction dataset 130 event. The available recommendations may be stored in a data file associated with user profile data 114. At block 366, the processing logic determines the nature, composition, hierarchy and ranking of the interaction recommendation list using a neural network model based at least in part on the available user data, inference information, audience member status, schedule, authorization level, privacy setting, notification protocol, user status and the like. At block 368, the processing logic coupled to API 24 selects at least one recommendation from data files associated with user profile data 114 and serves the recommendations to user interface 70 within ubicomp 12 or a user interface operating on computing device 26 using a distribution method and confirmation means. In some aspects, a distribution method and confirmation means can include an audible tone, voice or sound, visual image or graphic, alphanumeric value, video clip and the like. In some aspects, the rendered recommendations may be conditional and require a response that is time sensitive, the number of users that select the same recommendation, based which audience members respond, and the like. At block 370, the processing logic can change, edit or revise the recommendation list where the presented options are not accepted or selected by a single or multiple participants of the distributed interaction recommendations. Additional recommendations are re-distributed to respective users and added to the associated user profile data 114. In some aspects, the processing logic can change, edit or revise the recommendation list using a neural network model based at least in part on the available user data, inference information, audience status, schedule, notification protocol, user status and the like. In some aspects, the processing logic can solicit or receive interaction recommendation alternative from a user's interface via API 24 and add them to associated user profile data 114 as possible interaction recommendations based on the engagement data event or for future reference of user preference and interaction data. In some aspects, a user associated with an engagement event can initiate the distribution of a customized interaction recommendation list to a specific audience. At block 372, the neural network model is updated with interaction recommendation distribution service, response data, and user profile data 114. At block 374, the neural network model is updated with changes to system data, user profile data, preference data, interaction data, and content database associated with respective users. In some aspects, the process of the system or method 360 can continue to any of blocks 362, 364, 366, 368, 370, 372 or 374.

Referring to FIG. 3E, a flow diagram is depicted illustrating a system or method 380 for optimizing interaction recommendations using interaction data associated with a ubiquitous computing environment, according to an implementation of the disclosure. System or method 380 may be performed by processing logic that comprises hardware, software, or a combination thereof. In some aspects, system or method 380 may be performed by recommendation engine 100 coupled to ubicomp 12, API 24 and user profile data 114 stored on database 108. At block 382, processing logic generates a neural network model using computer application 78 to correlate engagement data 110 associated with interaction data 130 to identify user intention information and desired outcome information. At block 384, using the neural network model, the processing logic calculates and assigns weights and bias values to engagement data associated with user intention information 344 and desired outcome information 346. In some aspects, values for weights and biases may be generated from generic training data or historical data associated with a user profile. At block 386, using the neural network model, the processing logic determines correlations between user intention and interaction outcome information compared to interaction recommendations. At block 388, the processing logic determines if there is a minimum threshold met for the calculated weight and bias score combination that improves the accuracy of interaction recommendations. At block 390, if a minimum threshold is not met by the calculation, the processing logic will not initiate a recommendation for interaction and will archive data for future reference. At block 392, using the neural network model, the processing logic determines an interaction recommendation hierarchy based higher correlation scores between user intent information and desired outcome information. At block 394, using the neural network model the processing logic generate triggers using assigned weight and bias values to identify comparable engagement data 110, including weights and biases that indicate conditions, prerequisites, and precursors for interaction outcomes. At block 396, the processing logic presents and displays recommendations to users and, where applicable, include conditions, prerequisites, and precursors for interaction outcomes. At block 398, the neural network model is updated with changes to system data, user profile data, preference data (including user intention information and desired outcome information), interaction data, and content database associated with respective users. In some aspects, the process of system or method 380 can continue to any of blocks 382, 384, 386, 388, 390, 392, 394, or 396.

Objectively, recommendation engine 100 performs at an increasingly more efficient and accurate basis as engagement data 110 events provide greater intelligence of interaction data 130 and inference intelligence 132 insights including user preferences, lifestyle habits, tastes, behaviors, conditions, precursors, variables, contingencies and schedules such that interaction recommendations are presented in a timely, more relevant manner that promote and encourage user interaction along with more meaningful engagement between the users of the system.

Figure 4A:
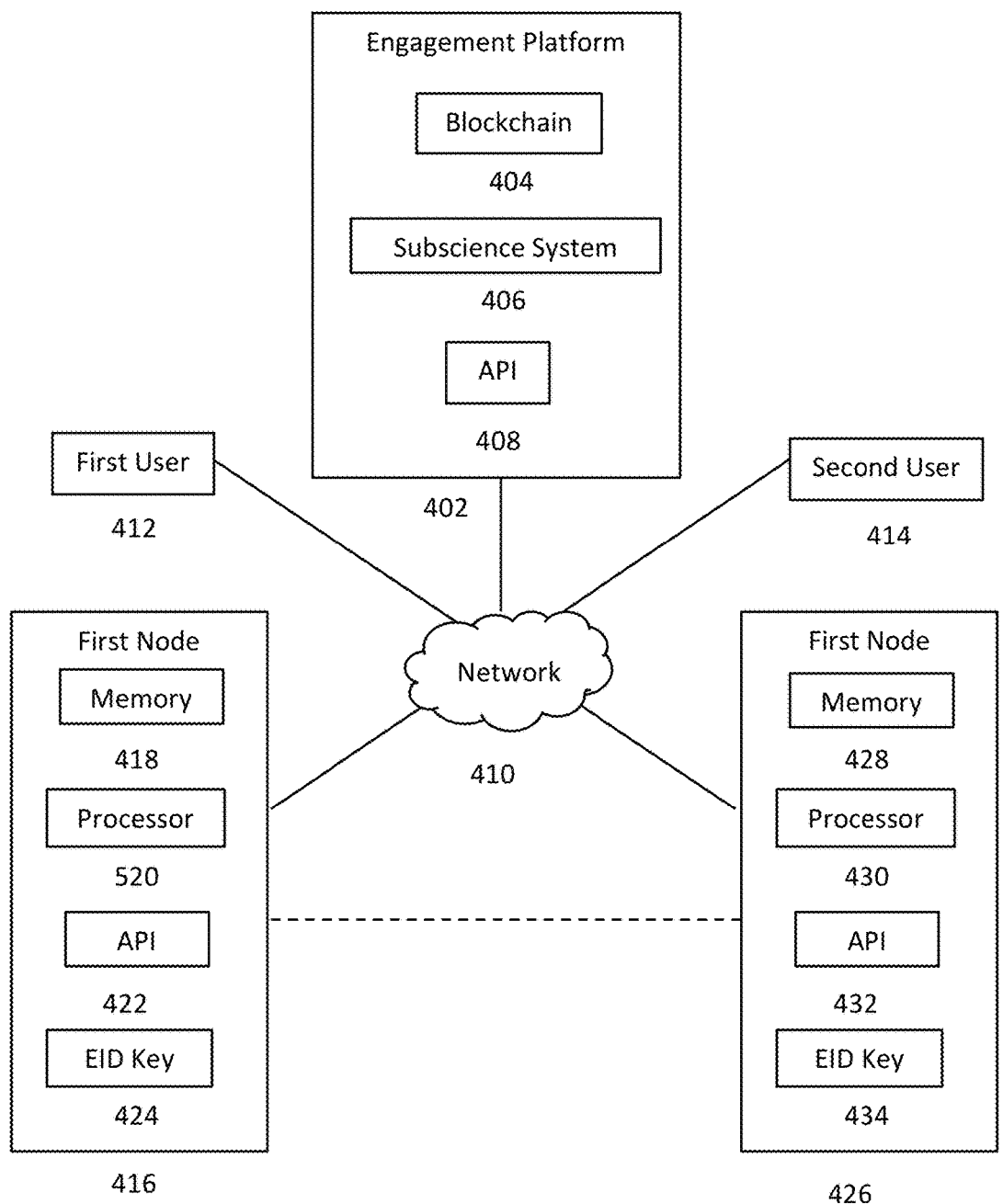
FIG. 4A illustrates a block diagram of an exemplary a blockchain-based engagement platform according to an aspect of the present disclosure.

Referring to FIG. 4A, an exemplary blockchain method or system 400 is illustrated implementing a blockchain-based engagement platform. In some aspects, method or system 400 is blockchain system technique or method 22. The present disclosure discloses blockchain techniques for securing and transacting engagement data and interaction data generated by and resulting from users, applications, and hardware operating within or connected to a ubiquitous computing environment. The aspects herein describe foundational information accessed and captured (engagement) and interpreted (interactions) on a peer-to-peer platform via computerized programs and applications for purposes such as identification, classification analytics, predictions, recommendations using various methods, processes, networks and devices. Transactions of such data, hereinafter described as Engagement Interaction Data, or EID, could be managed using blockchain architecture components including blocks, nodes, miners, consensus protocols, tokens, encrypted keys, and smart contracts and the like. In an exemplary aspect, an EID transaction record or ledger is held by all nodes of method or system 400 and each newly created block of EID delivered to each node is time stamped, independently verified by consensus protocols (consistency and up to date version of record), and processed by each node before being added to the blockchain as immutable data records. For discussing the present aspects, EID transactions may include information headers for various block data structures including main branch, side branch, and orphan that are mined and replicated to all nodes in the network. In some examples, when EID is detected and created by method or system 400, a block is and assigned a token value and, based on EID ownership and permissions granted to authorized associated users (receivers), said value is transferred by digitally signing the hash produced by adding the previous transaction and the public key of the receiver in a blockchain 404. In some aspects, a token is a unit of value assigned to EID digitally so that is may exist as a distributed record in the register of a blockchain on method or system 400. And, a smart contract is the software code or a protocol that is used to contribute to, verify or implement the negotiation or performance of a contract on method or system 400. In the present example, smart contracts can be used to control transfer of EID between users, devices and applications of the proposed innovation including related applications, parameters and protocols for identity management, authentication, digital rights, digital privacy, digital security, authorization access, digital assets, communications records, customer loyalty rewards, healthcare records, financial services, payment infrastructures, content copyrights, content royalties and the like.

It is noteworthy, based on the disclosures in this document regarding EID sources, to establish the importance of applying principles and standards to collecting, interpreting and sharing such data. Interpersonal communication methods and style, emotions and sentiments, bioinformatics and other quantified-self categories such as lifestyle habits and preferences are discoverable and interpretable with current technologies and the present disclosure aspects described herein elevate the value and protection afforded this type of content using cryptographic and encryption techniques. According to the methods and systems described herein, utilizing centralized and decentralized models, blockchained EID transaction protocols coupled to the disclosed peer-to-peer networks will establish and manage immutable block data and metadata that supports digital rights management, data security, data integrity, device registration along with authentication and validation efficiencies. Generally, method or system 400 generates, manages, and operates various components of blockchain techniques customized for EID transactions including decision managers, distributed ledgers, distributed hash tables, instruction set architecture, core hash algorithms, data encryption, public and private key cryptography, Merkle DAG, InterPlanetary File System, smart contracts, consensus algorithms, and the like.

Method or system 400 is coupled with or a component of a peer-to-peer engagement platform 402 that includes a blockchain 404, a blockchain sub-science system 406, an API 408, a network 410, a first user or "subject" 412, a second user or "associate user" of subject 414, a first node 416, and a second node 426. In some aspects, engagement platform 402 is system 10. In some aspects, engagement platform 402 operates and communicates with one or more of the following system 10 components: ubicomp 12, network 14, server 16, API 24, computing device 26, external system 28 and recommendation engine 100. As described previously, in some aspects of the innovation user, device, and ubicomp activity may be represented by one or more nodes 416, 426. In some aspects, node 416, 426 may be computing device 26 controlled by a user operating API 24 with a user interface to manage the user's engagement activity, user identity, subscriber activity, profile information and related platform data. In some aspects, node 416, 426 may be user interface 70 controlled by a user operating API 24 to manage engagement activity, user identity, subscriber activity, profile information and related platform data. In some aspects, a node 416, 426 may be represented by automated programming on a hardware component or appliance networked on platform 400 via API 24. In some aspects, node 416, 426 may be represented automated programming on system 10 operating software components of ubicomp 12, network 14, server 16, API 24, external system 28 or recommendation engine 100. In some aspects, system or method 400 is a virtual machine operating decentralized applications (or Dapps) on a computer network to manage nodes that store EID transaction records and smart contract histories of user and system activities with built-in consensus mechanisms. In some aspects, system or method 400 is a public block chain or a permissionless network. In some aspects, system or method 400 is a private or consortium blockchain wherein access is permission based.

Method or system 400 includes one or more blockchains 404. In some aspects, blockchain 404 is engagement data 110. Blockchain 404 may be coupled to a sub-science system 406 including memory or storage for blockchain related system and platform data, programs, applications, instructions, and the like. Method or system 400 includes one or more sub-science systems 406. Blockchain sub-science system 406 may be coupled to engagement platform 402 and method or system 400 to perform blockchain related operations, functions, and execute processes programs, applications, instructions, and the like. In accordance with previous descriptions of the innovation, engagement and interaction activity between users on engagement platform 402 may generate blocked chained EID and integrate EID transactions for individual and shared user accounts using blockchain database 404 and blockchain sub-science system 406. Method or system 400 is coupled to application programming interface (API) 408. In some aspects, API 408 is API 24. API 408 may implement interface operations for method or system 400, related components and devices including inputs and outputs for user input, video, graphics, and the like. Method or system 400 may use network 410 to facilitate communications between various components. In some aspects, network 410 is network 14. Method or system 400 may include at least one first user 412 and one second user 414. In some aspects a first user 412 or second user 414, in singular or group reference, may be referred to or defined as described as account holders, third-party participants, subscribers and contributors on method or system 400. In some aspects, a first user 412 or second user 414 is a living organism such as human or a pet. In some aspects, a second user 414 is identified as an associate user of first user 412. In some aspects, first user 412 is identified as an associate user of the second user 414. Method or system 400 may include one or more of first nodes 416 and second nodes 426. Node 416 may include one or more components including memory 418, processor 420, API 422, and EID key 424. Memory 418 may store, permanently or temporary, software, data, instructions or other executable commands for processors 420 on hardware and software components of method or system 400. In some aspects, there is one or more memory 418. Processor 420 may include electronic circuits or logic to process data, operate programs, or execute commands for hardware and software components of method or system 400. In some aspects, there is one or more processor 420. In some aspects, processor 420 architecture may include a microprocessor, microcontroller, arithmetic logic unit, video and graphics processors, and the like. API 422 may implement communication interfaces for user input, video, graphics, components, devices, applications, and software in digital and/or analog configurations. In some aspects, API 422 is API 24. EID key 424 may include any user 412 engagement or interaction information used in cryptographic transactions between public and private keys for identification, authentication and encryption. EID key 424 may be a digitally formatted combination alphanumeric characters stored in a memory 418. In some aspects, EID key 424 may be assigned to a single user 412 account, multiple user accounts, or an account with multiple users.

Node 426 may include one or more memory 428, processor 430, API 432, and EID key 434. Memory 428 may store, permanently or temporary, software, data, instructions or other executable commands for processors 430 on hardware and software components of method or system 400. In some aspects, there is one or more memory 428. Processor 430 may include electronic circuits or logic to process data, operate programs, or execute commands for hardware and software components of method or system 400. In some aspects, there is one or more processor 430. In some aspects, processor 430 architecture may include a microprocessor, microcontroller, arithmetic logic unit, video and graphics processors, and the like. API 432 may implement communication interfaces for user input, video, graphics, component operations, device functions, executing applications and software in digital and/or analog configurations for hardware and software components of method or system 400. In some aspects, API 432 is API 24. EID key 434 may include any user 414 engagement or interaction information used in cryptographic transactions between public and private keys for identification, authentication and encryption. EID key 434 may be a digitally formatted combination alphanumeric characters stored in memory 428. In some aspects, EID key 434 may be assigned to a single user 414 account, multiple user accounts, or an account with multiple users. Nodes 416 and 426 may be devices capable of communicating with components of method or system 400. In some aspects, nodes 416 and 426 are at least one or more of computing device 26. In some aspects, first node 416 and second node 426 are an electronic, machine based, networked apparatus, with or without a user interface, such as a vacuum, robot, flying drone, automated vehicle for humans, home appliance, voice user interface device, camera, HVAC system, mobile phone, television and the like.

Figure 4B:
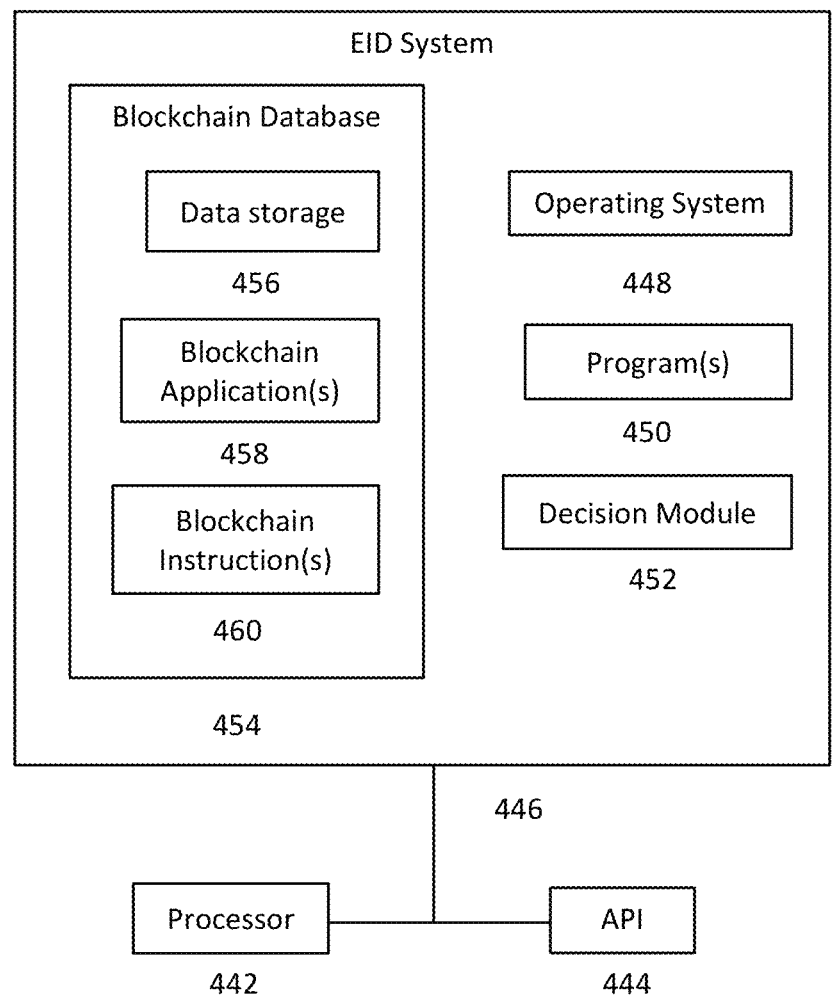
FIG. 4B illustrates a block diagram of an exemplary sub-science computing system for implementing a blockchain-based transactions on an engagement platform according to an aspect of the present disclosure.

Referring to FIG. 4B, a detailed block diagram is illustrated of a sub-science computing system 440 for implementing a blockchain-based transactions on an engagement platform 400. In some aspects, sub-science system 440 is sub-science system 406. Sub-science computing system 440 includes a processor 442, an API 444 and an EID system 446. Processor 442 may include electronic circuits or logic to process data, operate programs, or execute commands for hardware and software components of computing system 440.

In some aspects, sub-science computing system 440 includes one or more processors 442. In some aspects, processors 442 are configured for accessing blockchained EID storage 456 for operating blockchain data applications 458 operations using blockchain instructions 460 on local and/or remote blockchain databases 454 connected via a networked computer system 440 using API 444 interface. API 444 may implement communication interfaces for video, graphics, components, devices, applications, and software in digital and/or analog configurations for hardware and software components of sub-science computing system 440. In some aspects, API 444 may implement communications between various components of computing system 440 and method or system 400. In some aspects, API 444 is API 408. EID system 446 may include at least one operating system 448, EID program 450, decision module 452, and blockchain database 454. In some aspects, EID system 446 is one or more systems in a blockchain computer network to manage EID records and EID transactions. Operating system 448 may contain or access one or more software, applications, or executable programs 450, 458 for blockchain functions, transactions, controls and/or commands for various components of computing system 440. EID program(s) 450 may be one or more programs in a blockchain computer network to manage EID records and EID transactions. In some aspects, EID program 450 is coupled to programs operating on engagement platform 402 that extract, generate and analyze EID records. Decision module 452 may operate software, applications, or executable programs to analyze, process, and store EID and EID transaction records on a blockchain database 454. In some aspects, decision module 452 is one or more modules in a blockchain computer network to manage EID records and EID transactions. In some aspects, decision module 452 is a neural network program generated from computer application 78. In some aspects, decision module 452 is a component of recommendation engine 100.

The EID system includes a blockchain database 454 which includes a data storage 456, blockchain applications 458, and blockchain instructions 460. Data storage 456 may include storage for blockchained data 404. In some aspects, data storage 456 may include storage for EID and EID transaction records. In some aspects, data storage 456 may include storage for EID key 424, 434 information. Blockchain applications 458 may include a blockchain database application, cryptography applications, encryption applications, data formatting applications, computational applications, tokenization applications, logic applications, smart contract applications, and the like. Blockchain instructions 460 may include program and application instructions for blockchain applications 458, operating system 448, programs 450, and decision module 452 operation and functions. Through implementation of blockchain 404, users have control of EID that is generated and interpreted by their activity within ubicomp 12, with system components, other users, and third-party services connected via API 444 to system 400. For example, decision module 452 may operate with processor 442, operating system 448, and programs 450 according to filters, access permissions, pre-set commands for distribution and like, based on user preferences, that are governed by blockchain applications 458 and instructions 460 which determine what EID is extracted, formatted, processed, and stored by system 400 for use in blockchained transactions and records. In some aspects, EID blocks 404 representing a user and associated activity, along with master level control and ownership, are stored on a locally or remotely on an account associated with a user. In some aspects, stored EID blocks 404 are stored on data storage 456. In some aspects, stored EID blocks 404 are stored on node 418, 428 associated with a user or coupled to a user device. In operation, a network of sub-science computing systems 440 may operate on a blockchain network to aggregate and anonymize EID information for use by system 400. In some aspects, modified versions of generic EID information may be aggregated to represent a collection of user activities, behaviors, interactions and engagement preferences for various analytical, statistical, algorithmic, probabilistic and/or predictive applications and programs.

Various implementations of the disclosure relate to engagement platform activity, and more specifically, to interaction recommendations generated by a recommendation engine. Some implementations relate to interactions between an individual and a ubiquitous computing environment or ubicomp and networked technologies associated with a ubicomp. Some implementations relate to user engagements where a subject within a ubicomp interacts with one or more associated users that are remotely networked to the subject and relevant ubicomp activity data. Still further, some implementations relate to engagements between associated users outside the ubicomp where subject and ubicomp activity influences interactions and interaction recommendations. And, some implementations further relate to an engagement platform that learns behaviors, lifestyle habits, and engagement preferences using artificial intelligence to enable authorized users to receive insights based on interactions, of both a subject and associated users, that can optimize any aspect of user engagements regarding a range of subject and activities, for example, sleep times, eating, media consumption, phone calls, social visits, health care treatments, etc. A platform that can conveniently map user habits with correlated preferences enables individuals and groups to gain visibility and clarity of optimal conditions and schedules will improve their ability to better anticipate, plan, and efficiently execute customized interactions between users and on behalf of other users. For example, if collected intelligence regarding a subject's lifestyle reveals that they enjoy pictures and images of a specific nature during waking hours, the engagement platform can notify associated users of said preference and direct them to content online or identify content on their networked device along with a prompt to add the material to a queue for presentation at the desired time on the designated device. In the present example, the associated users become a de facto organic aggregation network as the engagement platform increasingly delivers greater detail regarding the lifestyle habits and engagement preferences of the subject to this ad-hoc aggregation network—in addition to identifying information, media, and interaction recommendation elements customized to the conditions and schedule that suits the subject, the associated user(s), or a compromised solution based on the priorities of each potential engagement participant.

Generally, an engagement platform, coupled to a recommendation engine with artificial intelligence and machine learning programming, would increasingly improve on identifying nuanced elements of preferred activities (subject, behavior, time, location, mood and etc.) as well as engagement precursors (inference information) and triggers (physical event, user engagement setting) that are indicative of desired interactions unique to each user of the system. Such preference, precursor, and trigger elements can be interpreted by artificial intelligence programming, compared to reference or training data, verified by the subject and associated users, and compared with historical user profile data to refine and customize recommendations for user interactions on the platform with each other and the system. Generally, for the purpose of improving overall lifestyle for engagement platform users, the resulting recommendation experiences can become more seamless and intuitive as user lifestyle habits, behaviors and preferences are learned and anticipated by the system (using passive sensor applications) and its ability to anticipate likely intentions and probable outcomes based on engagement and interaction data analytics. Such experiences should demonstrate a method and style of providing recommendations (device, presentation configuration, displayed information, timing, language, audio, video, images, symbols, etc.) and logic programming configured to each user's interaction perspective related to intentions and outcomes. For authorized users, an engagement platform that provides access to reliable lifestyle preference information can dramatically influence relationships, both social and professional, where granular level insights and foresights enable customized interactions in a vast number of distinct lifestyle settings: sharing social media, delivering streaming content, primary health care services, informal caregiving visits, emergency response systems, elder care, pet care, home security, scheduling transportation, food delivery, video calls and messaging, broadcast television viewing, advertising intelligence or public surveys. Knowing when to engage and how to interact is a powerful tool for users of an engagement platform, with recommendations that help people engage on desirable terms (individual or mutual) and offer tremendous collateral benefits socially, emotionally and economically.

Figure 5A:
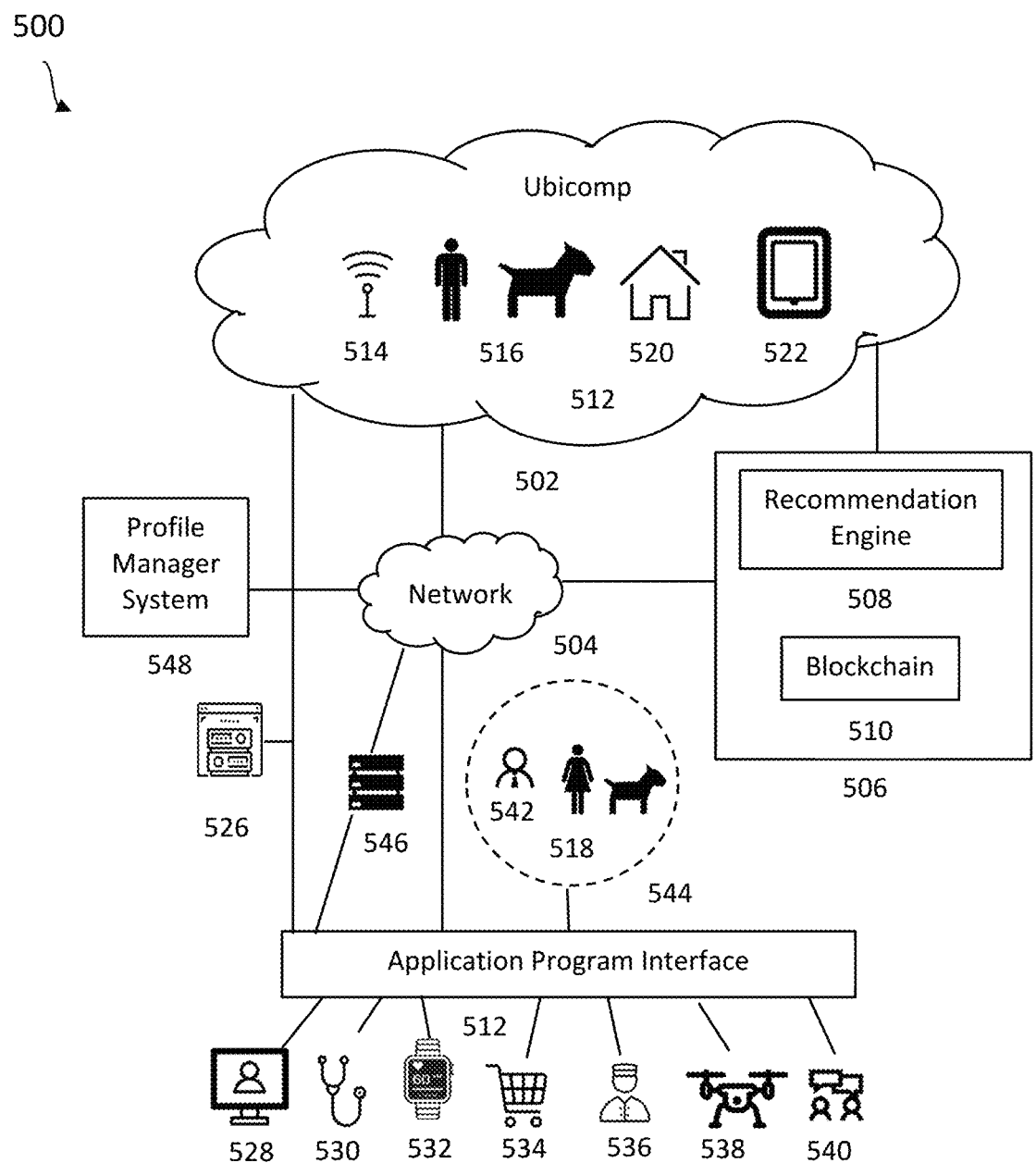
FIG. 5A illustrates a system diagram illustrating exemplary components of an engagement platform for interaction recommendations according to an aspect of the present disclosure.

Referring to FIG. 5A, a system diagram illustrating exemplary components of an engagement platform system 500 for interaction recommendations in which broad implementations of the disclosure may be used. In some aspects, system 500 is system 10. System 500 includes a ubiquitous computing environment or "ubicomp" 502, a network 504, a database 506, a recommendation engine 508, a blockchain 510, and a number of application program interfaces 512. In some aspects, ubicomp 502 is ubicomp 12. In some aspects, ubicomp 502 user activity and components may generate engagement data 110, interaction data 130 and inference intelligence 132, hereinafter collective referred to as "ubicomp data" 514 for use by system 500 from activities initiated by subjects within 516 and outside 518 ubicomp 502 using automated programming operating both fixed 520 and portable 522 networked hardware and software technologies within ubicomp 502. In some aspects, database 506 can include one or more databases or storage systems. In some aspects, database 506 stores system data, user data, program application data, recommendation engine data 508, blockchain information 510, and the like in accordance with previously disclosed implementations. In some aspects, recommendation engine 508 is recommendation engine 18. In some aspects, a blockchain 510 is a blockchain 22. Generally, API 512 enables communications between users and the system components, within a single system 500 or throughout a network of systems 500, where interface applications enable communications including sharing of text, audio and video data, video and audio calls, user activity data, user profile data, program execution and commands, platform data analytics and the like. In some aspects, API 512 is API 22. Without limitations on scope, function, controls and/or access authorization API 512 may be referenced for operating on a single device or collectively for operating on multiple networked devices simultaneously. In some aspects, API 512 functionality and operation varies based on the type of user and role, device type and purpose, system component configuration, physical or non-physical nature of an engagement or interaction. Further, API 512 facilitates connections and interaction recommendations for a variety of components and any number of users in various categories such as comparable systems, user activities, administrative users, developer users, devices, third-party services, e-commerce services, other vehicles, appliances, robots, drones and other networked technologies designed for ubicomp 502 enabled engagements in accordance with the described disclosures. In some aspects, API 512 can enable users 516, 518 to operate, manage and control information, components, network access and devices on system 500 with administrative authority 542. In some examples, administrator 542 may establish unique user groups or forums 544 comprised of user profile accounts 516, 518 including, for example, associated devices, components, programs, third-party services, and networks where multiple users of system 500 have access to specific information and data generated and/or managed by users 516, 518 associated with group 544. In some aspects, a user's 516, 518 status, measured by system 500 software and hardware components, generates biases for data values, skewed data classes and variations of data attribute values for ubicomp data 514 used by computer application 78, recommendation engine 508 and other programs used by system 500. In some examples, data biases and attributes influence or change ubicomp data 514 collection, interpretation, classification, categories, calculations, comparisons, predictions and the like. In some aspects, there are one or more user subjects 516 in group 544 and subject user 516 does not have to engage or interact with system 500 exclusively from within ubicomp 502 where devices and monitoring applications provide sufficient engagement and interaction data 514.

API 512 can be configured a user-oriented API for recommending interactions to human or animal user 516, 518. In some aspects, API 512 can communicate interactions recommending between human and animal 516, 518 users with an automated system interface 520 and/or device interface 522 responsive to physical controls, haptic gestures, voice enabled commands, facial recognition, emotion recognition, audible sounds, biometric data status, location based sensors, proximity sensors and other device enabled means described previously. API 512 can be configured for administrative controls and authorizations where, for example, a user or automated program may establish rules, filters or parameters for collecting, sharing or access to ubicomp data 514. In some examples, API 512, coupled to computer application 78 and recommendation engine 508 can solicit user 516, 518 experience feedback information using computer application 78 to manage automated systems 520 and device 522 controls for identifying user preferences before, during, and after user experience events where ubicomp data 514 is collected and recorded. In further examples, API 512 may initiate feedback information inquiries and solicit user responses with a variety user engagement methods such as a text message, electronic survey, electronic list, an audible questionnaire, measuring haptic gestures, requests for specific haptic or physical movements, measuring user biometrics, a voice command operation or control request, presenting images or photos, video calls, chat messages, and the like.

In some aspects, API 512 is configured such that a user 518 outside ubicomp 502 manages networked connections to API 512 within ubicomp, including system 500 operations, networked appliances 520, and devices 522 and access to ubicomp data 514. In one example, user 516 within ubicomp 512 is a human or animal and outside user 518 controls automated systems 520 and device 522 controls such as lighting, surveillance cameras, 2-way audio, automated feeder, HVAC, door locks, and etc. In another example, user 516 within ubicomp 512 is disabled or incapacitated and outside user 518 controls automated systems 520 and device 522 controls such as lighting, surveillance cameras, 2-way audio, HVAC zones, video calls, biometric measuring systems, motion sensor areas, home appliance, selection, delivery and presentation of audio, graphics, text and video content via streaming service, cloud server, cellular network, commercial subscription service, local network, or file stored on a local database. In yet another example, outside user 518 may create or adjust API 512 filters and settings for acquiring and analyzing ubicomp data 514 generated by user 516 within ubicomp 512 based on information provided by recommendation engine 508 regarding observed, historical and anticipated lifestyle habits and preferences.

API 512 can be configured for developer controls using integration platform 526 where at least one or more third-party program may be created to operate on system 500. A third-party program may include any variety of program code or software applications that compliment or enhance engagement system function, platform operations, user experiences, analytics, connections to third-party services, e-commerce, online information sources, web services and the like. In some aspects, database 506 may store integration platform 526 components such at least one software development kit, a development environment, program window, debugger, visual editor, compiler, runtimes, sample code, platform tools and data libraries for integrating a third-party program with API 512 and designated operating systems. Integration platform 526 enables third-party programs to add user controls, components and user experience features on top of API 512. Integration platform 526 enables third-party programs to add user controls, components and user experience features on top of the API 512 based on data provided by recommendation engine 508. In one example, integration platform 526 enables API 512 to interact with a third-party online program, web service, streaming data service, or second API. Generally, facilitated by API 512, interaction recommendations can be generated from virtually any ubicomp data 514 sequence or combination that defines an interaction which may be unique to an individual user 516, 518, multiple users 516, 518, user groups 544 and system 500 or related components, between two or more users 516, 518, two or more users 516, 518 and system 500 including individual components of the system, a collective networked group of system components, information and media content delivered to user 516, 518, and the like. Interaction recommendations may be provided in a variety of customized formats such as emails, text messages, multimedia presentations, images, graphs, lists, surveys, polls, customer reviews, audible tone, device notification sequences, a hyperlink to an online source or database, and other common communicative methods and means. API 512 can enable users 516, 518 to operate, manage and control information, components, network access and devices on system 500 with administrative authority 542. In some aspects, administrator 542 may establish unique user groups or forums 544 comprised of user profile accounts 516, 518 including, for example, associated devices, components, programs, third-party services, and networks where multiple users of system 500 have access to specific information and data generated and/or managed by users 516, 518 associated with group 544. In some aspects, administrator 542 may create a user account on behalf of another user 516 that is a primary user or "subject" in a unique user group 544 wherein administrator 542 invites other system 500 users 516, 518 to group 544. In some aspects, a primary or subject user's 516 status designation defines customization, orientation, and modification of system 500 applications, processes, operations, analytics, automation features and associated programs. In one example, subject user's 516 status generates biases for data, skewed data classes and data attribute values for ubicomp data 514 used by computer application 78 and other computerized programs used by system 500 that influence or change engagement and interaction data 514 collection, interpretation, classification, categories, calculations, comparisons, predictions and the like. To further the present example, the user profile status of an infant is distinguishable from the user profile of an elderly user, a user with a disabling illness, a handicapped user, an impaired user, an animal or any user with unique characteristics and preferences based on lifestyle requirements or living circumstances. In some aspects, there are one or more user subjects 516 in a group 544 and a subject user 516 does not have to engage or interact with system 500 exclusively from within ubicomp 502 where devices and monitoring applications provide sufficient ubicomp data 514. In some aspects, computer application 78 may process ubicomp data 514 of multiple users 516, 518 simultaneously using biases and attributes assigned to each respective user account. In some examples, computer application 78 may offer ubicomp data 514 preference information to recommendation engine 508 where a single or multiple users to a proposed interaction indicate desires or intentions for different interaction outcomes that may or may not be likely based on an outcome probability score, at which point recommendation engine 508 determines a list of possible actions, non-actions, alternatives or choices for soliciting additional feedback from group 544 participants. In some aspect, computer application 78 may solicit bias and attribute information from group participants using activity data collected tracked by system 500 components, empirical data associated with 516, 518 user profile accounts, behavioral data derived from ubicomp data 514, and direct inquiry via device 520,522 interfaces operating API 502 in a variety of forms such as presenting preference information related lists, multiple choice questionnaire, graphic images, photos, percentage values, audible sounds, maps or location based data, graphs and charts, and the like. In the present example, computer application 78 and recommendation engine 508 may submit and resubmit interaction recommendations to group 544 participants until there is a consensus on interaction outcomes. In some examples, consensus or agreement on interaction outcomes can be absolute for all group 544 participants, a consensus percentage of all group 544 participants for a particular interaction outcome (including non-action or decline to participate), a set affinity value for subject 516 members of a group 544, a subject's 516 associated users 518, a portion of group 544 participants, or the entirety of participants comprising group 544. In some aspects, computer application 78 and recommendation engine 508 may process available bias and attribute data such that desires or intentions for an individual user, 516 or 518, may outweigh desires or intentions of another participant, 516 or 518, in a proposed interaction.

In some aspects, administrator 542 assigns administrative access and permission levels, creates, deletes and modifies user 516, 518 accounts associated with group 544. In some examples, administrator 542 manages group 544 access to subject 516 including but not limited to device access, activity notifications, scheduling media content presentations, executing media content presentations, medical information, biometric data, user access permissions, user interaction rules, content filters, user ubicomp data 514, user engagement analytic data, interaction analytic data, and the like. In some examples, administrator 542 may establish a group 544 on behalf of a subject user 516, by inviting other users 518 and assigning access permissions, authorization levels, engagement filters, interaction rules, and user group preference data based parameters from user accounts associated with respective users 516, 518 of group 544. In some aspects, user group preference data is ubicomp data 514. In some examples, user group preference data is established by users 516, 518, 542 based on their unique role, contribution, position or event conditions within group 544 or interaction conditions derived therein. In some aspects, ubicomp data 514 that is detected, acquired, processed, interpreted and presented by system 500 may be collected, measured, processed, correlated, analyzed and presented by automated programming operations that are determined with API 512 program settings.

Media Engagement

In some aspects, media program 528, integrated with API 512 and coupled to recommendation engine 508 and blockchain 510, facilitates access, selection and presenting media content to users 516, 518. In some aspects, media program 528 is a subscription or account-based third-party program service for viewing, sharing downloading, or streaming media content. In the present example, as previously described, administrator 542 may create a user group 544 on behalf of a subject 516 to utilize media program 528 for generating, sourcing, selecting, sharing and presenting media content and associated system 500 data including ubicomp data 514 feedback information based on respective media program 528 user experiences. In the present example, ubicomp data 514 feedback information may include preference data, analytic data, notification data, predictive data, recommendation data, and the like. In one aspect, using API 512 controls, one or more users 518 may receive ubicomp data 514 notifications from recommendation engine 508 of user 516 preference information including data such as the type of music or artist preference, language, optimal conditions and timing for consuming a specific type, genre, artist, format, device type, device location, program title and/or selection of media content. In some examples, with automated programming or user designated settings, recommendation engine 508 generates media content lists for presentation to any authorized user 516, 518 based on user 516 media consumption preferences generated from newly detected and historical ubicomp data 514 associated with user 516. In other examples, recommendation engine 508 generates media content lists for presentation to any authorized user 516, 518 derived from aggregated media consumption preference data from newly detected and historical ubicomp data 514 collected from a defined group of users 516 on system 500 or a group of networked systems 500. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way video communications; video cameras enabling object recognition; portable devices operating API's; audio visual devices with automated content recognition programming; control systems for operating robotic and drone devices, and the like. In the present example, recommendation engine 508 may use computer application 78 to analyze and process ubicomp data 514 from individual users 516, 518 including aggregated media consumption preference data from activity in system 500 and aggregated data from a select group of individual users identified amongst all available users in a networked group of systems 500. In some examples, computer application 78 implements automated recommendation engine 508 processes to identify and recommend media content and media content lists based on individual user media consumption preference data or aggregated data from a group or group network of system 500 users. In some aspects, authorized users 516, 518 may request media content lists using API 512 controls to create and define media consumption preference data parameters with automated programming or manually created parameters such as demographics, consumption category, geography, device, lifestyle habits, and etc. In some examples, recommendation engine 508 may identify and generate lists of desired and/or available media content databases via local or remote networks 504 for presentation to both a subject user 516 and their associated users 518. In some examples, recommendation engine 508 may be coupled via network 504 to media sharing platform 528 for searching, browsing, selecting, purchasing, transacting, delivery, and presentation of media content using automated software programming that manages these functions according parameters set using API 512. In some examples, recommendation engine 508 may be coupled via network 504 to media sharing platform 528 using automated programming that generates media content and presents it according to user's 516 media consumption preferences derived from newly detected and historical ubicomp data 514. In some aspects, associated group 544 users may use API 512 to access recommended media content and create parameters for access and presentation to user 516 such as subject matter, genre, time of day, length or program, ubicomp data 514 triggers or thresholds, and the like.

Healthcare Engagement

In some aspects, health care program 530, integrated with API 512 and coupled to recommendation engine 508 and blockchain 510, provides personal health care and related information to one or more users 516, 518. In some aspects, health care program 530 is a subscription or account-based third-party program service for collecting, viewing, sharing, scheduling, and analyzing personal health care data and information generated from user experiences therein. In the present example, administrator 542 may create a user group 544 on behalf of a subject 516 to utilize health care program 530 for generating, analyzing, and sharing personal health care related information including real-time health status, interpersonal communications, care request notifications, patient conditions including ubicomp data 514 feedback information originating from respective health care program 530 user experiences. In the present example, ubicomp data 514 feedback information may include preference data, analytic data, predictive data, recommendation data, and the like. In one aspect, using API 512 controls, administrator 542 may create parameters, filters and settings for detecting, receiving, and distribution of ubicomp data 514 utilized by group 544. In the present example, using API 512 controls, administrator 542 may create parameters, filters and settings for processing, interpreting and analyzing ubicomp data 514 utilized by group 544. In some examples, parameters or filters may be applied using API 512 controls to identify, categorize and measure user 516 preference information such as personal health assessments, desired or needed patient care, descriptions of patient health status, time sensitivity for sharing and response to patient related notifications, detail level of patient information shared in notifications, and the like. In some aspects, using API 512 controls, one or more users 518 may receive ubicomp data 514 notifications from recommendation engine 508 of user 516 preference information generated from and associated with health care program 530 user experiences. Generally, user 516 preference information may include any health related data measurable by system 500 including but not limited to optimal conditions and timing for providing care, interactions via telecommunications means (call, text, chat), in-person visits, nursing care, physical therapy interactions, dining or feeding, emergency care, routine personal care services, and the like. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way video communications; video cameras enabling object recognition; portable devices operating API's; audio visual devices with automated content recognition programming; control systems for operating robotic and drone devices, and the like. In some examples, user 515 preference information may be generated and shared with group 544 or specific members 516, 518 based on newly detected data health care program 530 identifies via software operating within or networked to ubicomp 502 such as health diagnostic equipment, wearable biometric readings, video or audio device monitoring signals, emotion recognition signals, environmental sensor for climate control, motion or contact sensor, security sensors for smoke, fire or unauthorized entry, and the like. In some aspects, recommendation engine 508 of generates care related information based on user 516 preference information such as personal care list, care service prerequisites, care techniques and methods and care delivery schedule for any authorized user 518 to provide personal health care based on a subject user's 516 lifestyle habits and preferences generated from newly detected and historical ubicomp data 514. In some aspects, users 518 may use API 512 via health care program 530 to access recommended health care practices from a variety of sources such as networked reference databases, website services, web-based reference materials, video conferencing, and the like. In the present example, recommendation engine 508 may use computer application 78 to analyze and process ubicomp data 514 from individual users 516, 518 including aggregated health care preference data from activity in system 500 or aggregated data from multiple 516, 518 users that are active within a group of systems 500. In some examples, computer application 78 implements automated recommendation engine 508 processes to identify and recommend health care practices based on individual user 516 preference data or aggregated data from a select group of individual users 516 identified amongst all available users in a networked group of systems 500.

Caregiving Engagement

In some aspects, lifestyle and wellness program 532, integrated with API 512 and coupled to the recommendation engine 508 and blockchain 510, provides personal health data and lifestyle information using ubicomp 502 components including system 500 software applications operating fixed 520 and portable devices 522 that identify, collect, track, measure, interpret, analyze and present lifestyle and wellness information to one or more users 516, 518. In some aspects, lifestyle and wellness program 532 is a subscription or account-based third-party program service for collecting, viewing, sharing, scheduling, and analyzing personal lifestyle and wellness data generated from user experiences therein. In the present example, administrator 542 may create a user group 544 on behalf of a subject 516 to utilize lifestyle and wellness program 532 for generating, analyzing, and sharing personal lifestyle and wellness information including ubicomp data 514 feedback information originating from respective lifestyle and wellness program 532 user experiences. In the present example, ubicomp data 514 feedback information may include preference data, analytic data, predictive data, recommendation data, and the like. In some aspects, system 500 programs that are networked with fixed 520 and portable devices 522 may operate individually or collectively to manage lifestyle and wellness program 532 via software operating within or networked to ubicomp 502. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way audio video communications; video cameras enabling object recognition; portable devices operating API's; audio visual devices with automated content recognition programming; control systems for operating robotic and drone devices, and the like. In some aspects, using API 512 controls, administrator 542 may create parameters, filters and settings for detecting, receiving, and distribution of ubicomp data 514 utilized by group 544. In the present example, using API 512 controls, administrator 542 may create parameters, filters and settings for processing, interpreting and analyzing ubicomp data 514 utilized by group 544. In some examples, parameters or filters may be applied using API 512 controls to determine and measure user 516 preference information such as mood data analysis, methods for description of health status, time sensitivity for sharing and response to notifications, detail level of information shared in notifications, and the like. In some aspects, using API 512 controls, one or more users 518 may receive ubicomp data 514 notifications from recommendation engine 508 of user 516 preference information generated from and associated with lifestyle and wellness program 532 user experiences. Generally, user 516 preference information may include any lifestyle and wellness related data measurable by system 500 including but not limited to activity levels, activity schedule, sleep schedule, sleep quality, food consumption habits, food consumption schedule, media consumption schedule, media consumption habits, inter-personal social activity schedule, online activity habits, technology usage, and the like. In some examples, user 516 preference information may be generated and shared with group 544 or specific members 516, 518 based on detected behavioral data within ubicomp 602 such as a wearable biometric reading, video or audio device for person to person communications, emotion recognition signals, environmental sensors, motion or contact sensors, smart device online activity data, download and streaming content activity, facial recognition of users, networked appliances, and the like. In some aspects, users 516, 518 may use the API 512 via lifestyle and wellness program 532 to obtain recommended lifestyle and wellness interaction lists for user 516 such as probable sleep hours, probable food consumption schedules, preferred media content, preferred media consumption schedules, preferred medicine administration timetable, optimal conditions for person to person communications or in-person interactions. In the present example, recommendation engine 508 may use computer application 78 to analyze and process ubicomp data 514 from individual users 516, 518 including lifestyle and wellness preference data from activity in system 500 and aggregated data from multiple 516, 518 users and groups 544 that are active within a group of systems 500. In some examples, computer application 78 implements automated recommendation engine 508 processes to identify and recommend health care practices based on individual user preference data or aggregated data from a select group of individual users identified amongst all available users in a networked group of systems 500.

Consumer Goods Delivery Engagement

In some aspects, consumable goods program 534 provides consumption data and recommendations using ubicomp 502 components to users of the system 500. In some aspects, consumable goods program 534 includes system 500 software applications operating fixed 520 and portable devices 522 that identify, collect, track, measure, interpret, analyze and present consumption data and recommendation information to one or more users 516, 518. In some aspects, consumable goods program 534 is a subscription or account-based third-party program service for collecting, viewing, sharing, scheduling, and analyzing consumable and edible goods, hereinafter "consumable goods" consumption and recommendation data generated from user experiences therein. In the present example, consumable goods program 534 may be a grocery or retailer transacting food and/or merchandise including delivery to a location designated by the purchaser. In the present example, administrator 542 may create a user group 544 on behalf of a subject 516 to utilize consumable goods program 534 for generating, analyzing, and sharing personal consumption information including ubicomp data 514 feedback information originating from respective consumable goods program 534 user experiences. In the present example, ubicomp data 514 feedback information may include preference data, analytic data, predictive data, recommendation data, and the like. In some aspects, system 500 programs that are networked with fixed 520 and portable devices 522 may operate individually or collectively to manage consumable goods program 534 via software operating within or networked to ubicomp 502. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way video communications; video cameras enabling object recognition; portable devices operating API's; audio visual devices with automated content recognition programming; control systems for operating robotic and drone devices, and the like. In the present example, using API 512 controls, administrator 542 may create parameters, filters and settings for detecting, receiving, and distribution of ubicomp data 514 utilized by group 544. In the present example, using API 512 controls, administrator 542 may create parameters, filters and settings for processing, interpreting and analyzing ubicomp data 514 utilized by group 544. In some examples, parameters or filters may be applied using API 512 controls to determine and measure consumable goods user 516 preference information. In some examples, parameters or filters may be applied using API 512 controls to determine and measure consumable lifestyle goods user 516 preference information. Generally, user 516 preference information may include any consumable goods related data measurable by system 500 including but not limited to consumable and edible goods such as types of foods and beverages, food preparation techniques, food consumption schedule (time, duration, frequency), food brands, portion size, consumption methods, utensils; and lifestyle goods such as paper goods, soaps, lotions, toiletries, clothing, bedding materials, hair and facial products, personal hygiene products, vitamins, medicines, and the like. In some aspects, using API 512 controls, one or more users 516, 518 or group 544 may receive ubicomp data 514 notifications from recommendation engine 508 of user 516 preference information generated from and associated with consumable goods program 534 user experiences. In some examples, user 516 preference information may be generated and shared with group 544 or specific members 516, 518 based on detected behavioral data within ubicomp 502 such as a wearable biometric reading, video or audio device for person to person communications, emotion recognition signals, environmental sensors, motion or contact sensors, smart device online activity data, download and streaming content activity, facial recognition of users, networked appliances, and the like. In some aspects, users 516, 518 may use the API 512 via consumable goods program 534 to obtain recommended consumable goods program 534 lists for user 516 such as pending purchase list for consumables, food types, product types, replenishment schedule, preparation methods, consumption preparation and planning, local retail and online sources for ordering items, delivery schedules, and the like. In the present example, recommendation engine 508 may use computer application 78 to analyze and process ubicomp data 514 from individual users 516, 518 including consumable goods activity in system 500 and aggregated data from multiple 516, 518 users that are active within a group of systems 500. In some examples, computer application 78 implements automated recommendation engine 508 processes to identify and recommend consumable goods, purchase and procurement sources, delivery methods, deployment and implementation for users, and user scheduling based on individual user preference data or aggregated data from a select group of individual users identified amongst all available users in a networked group of systems 500.

Personal Services Engagement

In some aspects, lifestyle services program 536 provides personal service recommendations to one or more users 516 detected in ubicomp 502. In some aspects, personal services program 536, integrated with API 512 and coupled to recommendation engine 508 and blockchain 510, includes system 500 software applications operating fixed 520 and devices 522 that identify, collect, track, measure, interpret, analyze and present activity, behavioral, and lifestyle data of one more users 516, 518. In some aspects, users 516, 518 may either be a human or an animal. In some aspects, lifestyle services program 536 is a subscription or account-based third-party program service for collecting, viewing, sharing, scheduling and analyzing user activity, behavioral and lifestyle data and presenting recommendation data generated from user activities, interactions and experiences therein. In some aspects, administrator 542 may establish a group 544 comprised of both human and animal users 516, 518. In the present example, administrator 542 may create a user group 544 on behalf of a subject 516 to utilize lifestyle services program 536 for generating, analyzing, and sharing personal lifestyle information including ubicomp data 514 feedback information originating from respective lifestyle services program 536 user experiences. In the present example, ubicomp data 514 feedback information may include preference data, analytic data, predictive data, recommendation data, and the like. In some aspects, system 500 programs that are networked with fixed 520 and portable devices 522 may operate individually or collectively to manage lifestyle services program 536 via software operating within or networked to ubicomp 502. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way video communications; video cameras enabling object recognition; portable devices operating API's; audio visual devices with automated content recognition programming; control systems for operating robotic and drone devices, and the like. In the present example, using API 512 controls, administrator 542 may create parameters, filters and settings for detecting, receiving, and distribution of ubicomp data 514 utilized by group 544. In the present example, using API 512 controls, administrator 542 may create parameters, filters and settings for processing, interpreting and analyzing ubicomp data 514 utilized by group 544. In some examples, parameters or filters may be applied using API 512 controls to determine and measure user 516 lifestyle preference information. Generally, user 516 preference information may include any lifestyle data measurable by system 500 including but not limited to household activities such as washing clothes, cooking food, cleaning floors, wiping counters and windows, sweeping, dusting as well as other personal services such as grass cutting, animal care, gardening, landscaping, reading, music listening, TV watching, computer browsing, garbage removal, painting, moving furniture, personal transportation, and the like. In some aspects, using API 512 controls, one or more users 516, 518 or group 544 may receive ubicomp data 514 notifications from recommendation engine 508 of user 516, 518 preference information generated from and associated with lifestyle services program 536 user experiences. In some examples, user 516 preference information may be generated and shared with group 544 or specific members 516, 518 based on environmental changes and/or detected behavioral data within ubicomp 502 such as a wearable biometric reading, video or audio device for person to person communications, emotion recognition signals, environmental sensors, motion or contact sensors, smart device online activity data, object recognition, download and streaming content activity, facial recognition of users, networked appliances, and the like. In some aspects, users 516, 518 may use the API 512 via lifestyle services program 536 to obtain recommended lifestyle services program 536 lists for user 516 such as available services, pending services to be provided, service itemization and pricing, calendar based service events and schedules, conditions and prerequisites for service renderings, available vendors and principals for providing lifestyle services, notifications for vendor and principal engagements, references for service vendors and principals, and the like. In the present example, recommendation engine 508 may use computer application 78 to analyze and process ubicomp data 514 from individual users 516, 518 including lifestyle activity, behaviors, routines, practices and habits in system 500 and aggregated data from multiple 516, 518 users that are active within a group of systems 500. In some examples, computer application 78 implements automated recommendation engine 508 processes to identify and recommend lifestyle services, procurement, implementation and scheduling based on individual user 516, 518 preference data or aggregated data from a select group of individual users identified amongst all available users in a networked group of systems 500.

Robotic Assistant Engagement

In some aspects, robotic surrogate program 538 provides robotic enabled physical support and assistance services to one or more users 516 detected in ubicomp 502. In some aspects, robotic surrogate program 538, includes system 500 software applications operating fixed 520 and devices 522 that identify, collect, track, measure, interpret, analyze and present activity, behavioral, and lifestyle data of one more users 516, 518. In some aspects, users 516, 518 may either be a human or an animal. In some aspects, robotic surrogate program 538 is a subscription or account-based third-party program service for collecting, viewing, sharing, scheduling and analyzing user activity, behavioral and lifestyle data and presenting recommendation data generated from user activities, interactions and experiences therein. In some aspects, administrator 542 may establish a group 544 comprised of both human and animal users 516, 518. In the present example, administrator 542 may create a user group 544 on behalf of a subject 516 to utilize robotic surrogate program 538 for generating, analyzing, and sharing personal lifestyle information including ubicomp data 514 feedback information originating from respective robotic surrogate program 538 user experiences. In the present example, ubicomp data 514 feedback information may include preference data, analytic data, predictive data, recommendation data, and the like. In some aspects, system 500 programs that are networked with fixed 520 and portable devices 522 may operate individually or collectively to manage robotic surrogate program 538 via software operating within or networked to ubicomp 502. In some aspects, the robotic surrogate program 538 operates a variety of drone and robot configurations, for example, a robotic vacuum, toy robot, robotic cart, multiple-legged package carrying robot, flying drone with audio visual communications means, a flying drone equipped with pressurized water and air hose, outdoor all-terrain vehicle, pet walking robot, or an autonomous driving vehicle for transporting people and cargo. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way video communications; video cameras enabling object recognition; portable devices operating API's; audio visual devices with automated content recognition programming; control systems for operating robotic and drone devices, and the like. In the present example, using API 512 controls, administrator 542 may create parameters, filters and settings for detecting, receiving, and distribution of ubicomp data 514 utilized by group 544. In the present example, using API 512 controls, administrator 542 may create parameters, filters and settings for processing, interpreting and analyzing ubicomp data 514 utilized by group 544. In some examples, parameters or filters may be applied using API 512 controls to determine and measure user 516 lifestyle preference information. Generally, user 516 preference information may include any lifestyle data measurable by system 500 including but not limited to personal mobility, dexterity, endurance, physical abilities, vision, hearing, sense of smell, and the like. In some aspects, using API 512 controls, one or more users 516, 518 or group 544 may receive ubicomp data 514 notifications from recommendation engine 508 of user 516, 518 preference information generated from and associated with robotic surrogate program 538 user experiences. In some examples, user 516 preference information may be generated and shared with group 544 or specific members 516, 518 based on environmental changes and/or detected behavioral data within ubicomp 502 such as a wearable biometric reading, video or audio device for person to person communications, emotion recognition signals, environmental sensors, motion or contact sensors, smart device online activity data, object recognition, download and streaming content activity, facial recognition of users, networked appliances, and the like. In some aspects, users 516, 518 may use the API 512 via robotic surrogate program 538 to obtain physical support and assistance lists for user 516 such as walking assistance, retrieving food, washing clothes, cleaning household items, dusting fixtures and furniture, security and surveillance, managing Internet of Things (IoT) appliances and devices, online VoIP interfaces, and the like. In the present example, recommendation engine 508 may use computer application 78 to analyze and process ubicomp data 514 from individual users 516, 518, in addition to data from drones and robots operated by robotic surrogate program 538, including lifestyle activity, behaviors, routines, practices and habits in system 500 and aggregated data from multiple 516, 518 users that are active within a group of systems 500. In some aspects robotic surrogate program 538 may use computer application 78 to operate training programs to customize device operations based on user preferences including task performance sequence, timing, response sensitivity, user behaviors, ubicomp conditions, authorized user API controls, and the like. In some examples, computer application 78 implements automated recommendation engine 508 processes to identify and recommend support and assistance services, deployment, implementation and scheduling based on individual user 516, 518 preference data or aggregated data from a select group of individual users identified amongst all available users in a networked group of systems 500.

Social Network Engagements

In some aspects, affinity program 540 provides user experience preference recommendations to optimize ubicomp 502 interactions and socializing for users 516, 518 between individual users, amongst group 544 members and multiple groups using various technologies networked with the system 500. In some aspects, affinity program 540, integrated with API 512 and coupled to recommendation engine 508 and blockchain 510, facilitates access, selection and presenting user experience preference data to users 516, 518. In some aspects, affinity program 540 is a subscription or account-based third-party program service for collecting, analyzing and sharing user experience data. In the present example, as previously described, administrator 542 may create a user group 544 on behalf of a subject 516 or multiple subjects to utilize affinity program 540 for generating, selecting, sharing and presenting user experience data and associated system 500 data including ubicomp data 514 feedback information based on respective affinity program 540 user experiences. In the present example, ubicomp data 514 feedback information may include preference data, analytic data, notification data, predictive data, recommendation data, and the like. In one aspect, using API 512 controls, one or more users 516, 518 may receive ubicomp data 514 notifications from recommendation engine 508 of user 516, 518 preference information such as experience types, experience event categories, experience event titles name, user experience participants, experience descriptions, frequency of user experiences (days and times, by category, engage event precursors, intensity of user connection to experiences, intensity of user connection to other users, strength of social connections between users, strength of user group connections to event experiences, frequency of event experiences, duration of event experiences, event experience conditions, event experience precursors, event triggers, and the like. In the present example, intensity of user affinity level of user connections, experiences, and events may be determined where computer application 78 analyses and compares ubicomp data 514 before, during and after an event experience such as biometrics, emotions, behaviors, physical activity levels, lifestyle habits and social activity in addition to historical user profile preference data and/or training data. Similarly, in another example, correlations may be determined from engagements and interactions between users 516, 518 to measure strength of connection or affinity between users 516, 518 as individuals or within a group 544, and strength of social connections to experiences and events where computer application 78 analyses ubicomp data 514 before, during and after an event experience such as biometrics, emotions, behaviors, physical activity levels, social activity in addition to historical user profile preference data and/or training data compiled collectively from all group participants. In a further example, the intensity of user affinity may be reflected by lifestyle activity and behaviors such as frequency of engagements (such as sharing media, text, chats, calls, in person visits), similarity of engagements, optimal conditions for specific interactions, sentiment consistencies, sentiment levels, communications exchange rate, initiation rate of communication, response rate to detected engagement data, response rate to interaction opportunity, event participants, participation reliance level (per event, time, other participants, precursors), group reliability metrics for engagement and interaction participation, physical distance to event experience, sentiment intensity rating average, comparative analytics of engagement dynamics by group member, ranked and rated comparisons of group member engagement metrics (how much, how often, intensity level, initiating interactions, accepting interaction invitations, distance traveled for event experiences, authority levels in addition to information access permissions, filters and privileges. In some aspects, recommendation engine 508 and computer application 78 provide interaction recommendations to users of the system 500. In some examples, with automated programming or user designated settings, recommendation engine 508 generates interaction lists for presentation to any authorized user 516, 518 based on user 516, 518 affinity preferences generated from newly detected and historical ubicomp data 514 associated with user 516, 518 activity. In other examples, recommendation engine 508 generates affinity data lists for presentation to any authorized user 516, 518 provided by preference data related analysis of newly detected and historical ubicomp data 514 collected from individual users 516, 518 interaction with each other, within group 544 dynamics and with various components and applications operating in the system 500. In the present example, system 500 programs may include hardware and software applications such as biometric sensors capturing physiological conditions, facial recognition sensors identifying users and capturing emotional states; motions sensors tracking physical movement and haptic gestures; location sensors tracking location and proximity to other objects; environmental sensors tracking light levels, door locks, and room temperature; audio sensors capturing sound and voice commands; video cameras enabling 2-way video communications; video cameras enabling object recognition; portable devices operating API's; audio visual devices with automated content recognition programming; control systems for operating robotic and drone devices, and the like. In some examples, computer application 78 implements automated recommendation engine 508 processes to identify and recommend interactions based on individual affinity data or aggregated affinity data from a group or group network of system 500 users. In some aspects, authorized users 516, 518 may request affinity data lists using API 512 menus or setting controls that create and define affinity data collection and analysis methods with automated programming or manually customized parameters such as demographics, consumption category, content type, length of program, desired event experience, activity, group member, geography, device functionality, user intention, lifestyle habits, and etc. In some examples, recommendation engine 508 may identify and generate lists of desired interactions for presentation to both a subject user 516 and their associated users 518 with a group 544 or network of groups 544. In some examples, recommendation engine 508 may be coupled via the network 504 to affinity program 540 for searching, browsing, selecting, purchasing, transacting, delivery, and presentation of affinity data using automated software programming on system 500 operated or third-party applications that manage these functions according parameters set using the API 512. In some aspects, affinity program 540, recommendation engine 508 and computer application 78 may be coupled via network 504 to using automated programming that generates affinity lists using user behavior and lifestyle training data stored on remote or third-party database sources. In the present example, API 512 coupled to recommendation engine 508 and computer application 78 may present affinity lists identifying preferences of specific users 516 to other users 518 or groups 544 according to the recipients preferences for lifestyle habits, schedule, device connectivity and the like that are identifying and learned with each user engagement. To further the present example, recommendation engine 508 and computer application 78 may operate in a learning mode capacity where, based on recipient's 518 experiences, such as repeating a choice to decline recommendation requests for video chats during their drive times or work hours yet accepting similar recommendations on evenings and weekends, system 500 identifies ubicomp data 514 conditions, precursors, thresholds and triggers that refine preference data analytics and subsequent recommendations for interacting including the nature of engagement (social, professional, emergency), delivery methods, timing, device performance, and the like.

Without limitation to the disclosed innovation, there are a variety of integration platform 526 possibilities where lifestyle habits and preference data can be generated from programs coupled to computer application 78, recommendation engines 508 and blockchains 510 processes and applications, as described in the innovations herein, that securely deliver engagement and interaction information which can greatly improve and enhance the purpose, functionality, and overall impact of such programs for users of system 500.

API 512 and integration platform 526 can configured for system controls 546. System controls 548 can be coupled to network 504, database 506, recommendation engine 508, blockchain 510, and ubicomp 502. In some aspects, system level controls 546 can operate Software as Service (SaaS) programs, Artificial Intelligence as Service (AiaS), Infrastructure as a service (IaaS) programs, platform as a service (PaaS) and similar computing resources that manage system 500 infrastructure components and software applications. In some aspects, system level controls 546 include detailed billing, monitoring, log access, security, load balancing and clustering, storage resiliency, data backup, replication and recovery. In some aspects, system level controls 546 can operate platform applications, API software management and updates, hardware and device operations, communication infrastructure, network access, network security protocols, cryptography, encryption and decryption processes, automated program changes and updates, database functions, diagnostics, cloud operations, device connectivity, access to stored information, automated controls and user interface commands, and the like.

API 512 and integration platform 526 can configured for user profile manager systems 548. Profile manager system 548 can be coupled to network 504, database 506, recommendation engine 508, blockchain 510, and ubicomp 502. In some aspects, profile manager system 548 can operate Software as Service (SaaS) programs, Artificial Intelligence as Service (AiaS), Infrastructure as a service (IaaS) programs, platform as a service (PaaS) and similar computing resources that manage system 500 infrastructure components and software applications. In some aspects, profile manager system 548 includes user activity data, historical system activity data, empirical data, training data, system component data, log-in data, engagement data, interaction data, recommendation data, preference information, survey data, and other relevant user profile information sources. In some aspects, profile manager system 548 can operate platform applications, API software management and updates, hardware and device operations, communication infrastructure, network access, network security protocols, cryptography, encryption and decryption processes, automated program changes and updates, database functions, diagnostics, cloud operations, device connectivity, access to stored information, automated controls and user interface commands, and the like.

In some aspects, as previously described in the disclosure, one or a combination of APIs 512 can communicate blockchain 510 data. In some aspects, blockchain data 510 can include ubicomp data 514. In some aspects, methods and techniques for processing encrypted blockchained data 510 described previously can be incorporated into any variety or combination of ubicomp data 514 generated, shared and transmitted by system 500 including but not limited to user profile data, user activity data, financial data, ecommerce data, statistical data, biometric data, location data, and the like.

Figure 5B:
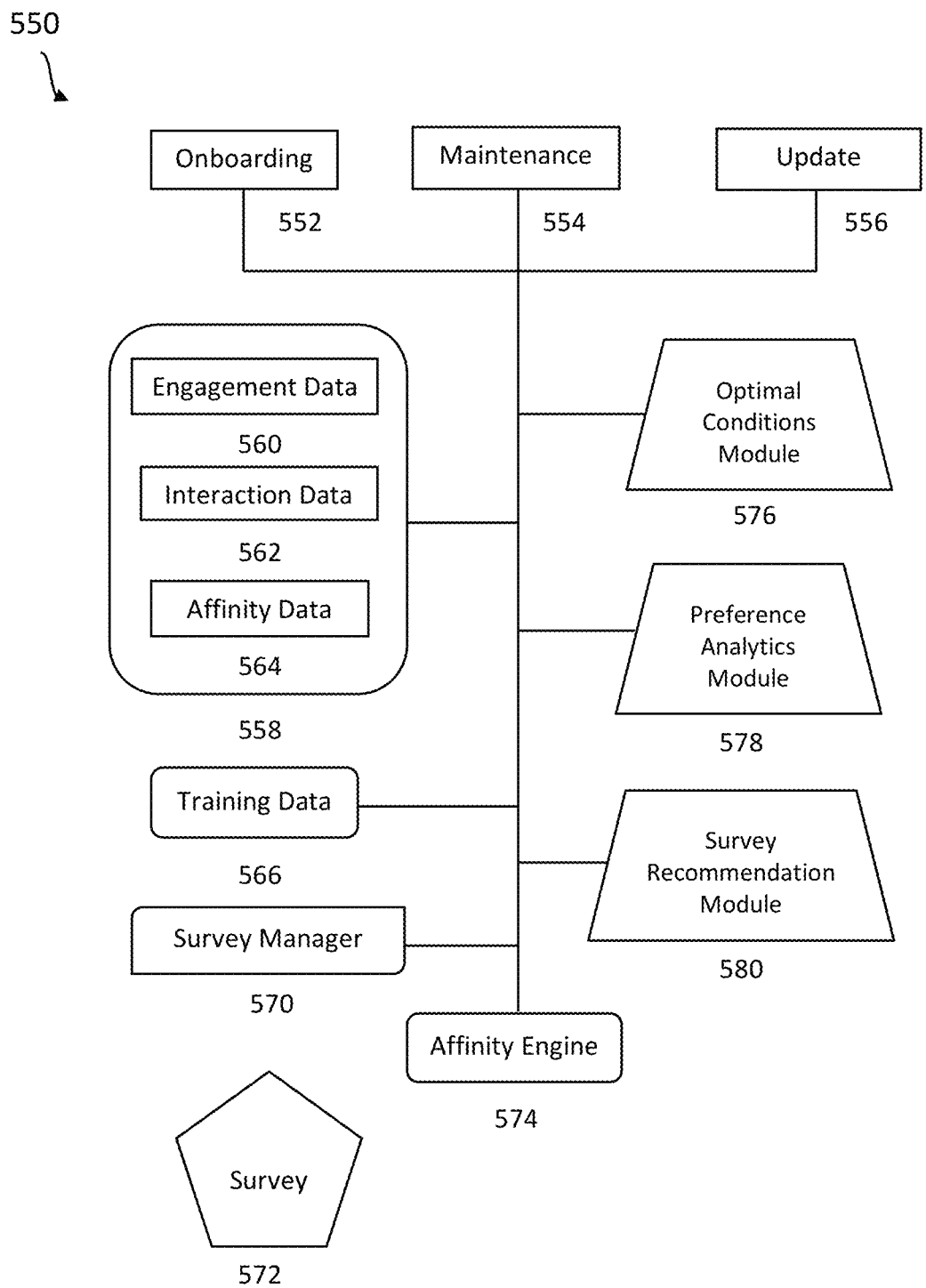
FIG. 5B illustrates a block diagram of an exemplary user profile manager application operating on an engagement platform for interaction recommendations according to an aspect of the present disclosure.

Referring to FIG. 5B, an exemplary aspect is illustrated of a user profile manager system 550 for operating and management of computer software with operations and functions including user profile onboarding, user profile maintenance and updating user profile data and related information accessed on system 500. The method includes approximating affinity data that users of an engagement platform have for various types of lifestyle activities, personal habits, and interactions within ubicomp 512, with other users 516, 518, within groups 544, with third-party programs, and with system 500 components and software applications. The method includes rating and ranking affinity data levels associated with user activities and interactions using approximations to determine user preference in various forms such as numerical, percentages, scales, charts, and etc. to depict correlations values such as intensity, duration, frequency, historical preference, anticipated preference and the like. The method includes a survey service that 1) collects and stores affinity data associated with user profile data accounts, 2) maintains accuracy levels of affinity data associated with user accounts, 3) updates affinity data associated with user accounts user activity when prompted by user activity, engagement data, interaction data as well as thresholds, benchmarks, and triggers for these and other datasets identify by system 500 and described previously. The method includes an affinity data verification process for measuring and testing the accuracy, reliability, and integrity of affinity and preference information attributed or associated with user profile data using reinforcement learning (RL) techniques and applications.

Generally, for each user account established by system 500, profile manager 550 operates processes, applications and system 500 functions related to user data management. In some aspects, profile manager 550 is a system or method for user data onboarding application 552, user data maintenance application 554 and user data update application 556. In some aspects, profile manager 550 manages user data associated with an electronic unique-user identifying account stored on a user profile database 558. In some examples, user profile database 558 is user profile database 114. In some aspects, user data 558 may be comprised of engagement data 560, interaction data 562, and affinity data 564. In some examples, engagement data 560 is engagement data 110. In some aspects, interaction data 562 is interaction data 130. In some examples, affinity data 564 is inference intelligence 132. In some aspects, profile manager 550 manages generic training data stored on training database 566. In some examples, training database 566 may store labeled and unlabeled training data available to the system 500, including training data 112 from recommendation engine 100. Overall, profile manager 550 enables and facilitates affinity and preference information for purposes of promoting and identifying quality engagements and satisfying user desires for interaction outcomes.

Profile manager 550 may be comprised of a survey manager 570. In some aspects, survey manager 570 is a program or application for managing, formatting, deploying, and presenting information inquiries or surveys 572 to existing users and newly created account holders of system 500. In some examples, survey manager 570 operates according to user status, inquiry type, or information sought related to systems or methods required for onboarding, maintenance or updating user profile data. In some aspects, survey manager 570 may present a single or multiple surveys 572 to users of the system 500. In some examples, survey 572 may be comprised electronic email, text, video, audio, imagery, photos, lists, charts, graphs or any combination thereof. In other examples, survey 572 may be presented with a voice activated computer program. In still other examples, survey 572 may consist of a slide presentation, audio visual program, interactive multiple-choice survey, subject matter preference and comparison survey, touch screen multiple choice survey, and the like. In some examples, survey manager 570 may customize survey 572 according to style, format, content, presentation method based on specific variables or a combination therein including subject matter, audience, user preferences, API 512 settings, device type, format requirements, and the like. In some aspects, survey manager 570 may be coupled to an affinity engine 574. In some aspects, affinity engine 574 is computer application 78. Affinity engine 574 is a process or set of processes that correlate user data 558, training data 566 and survey data 572 to determine correlation values relative to profile manager 550 system or method operations for establishing, verifying, processing and analyzing user preference information or affinity data 564. In some aspects, affinity engine 574 generates affinity data 564 for use by onboarding application 552, user data maintenance application 554 and user data update application 556. In some aspects, affinity engine 574 is an artificial intelligence software application that creates survey 572 content and related presentation information for profile manager 550 operations. In some examples, affinity engine 574, coupled to other profile manager 550 components, creates survey 572 content and related presentation information according to specific profile manager 550 operations including but not limited to onboarding 552, maintenance 554, updates 556, optimal conditions 576, preference analytics 578, survey recommendations 580, specific or aggregated user data 558, training data 566, specific or aggregated system 500 information, user input with API 512 or any combination therein. The correlation calculations and analysis performed by the affinity engine 574, in operation with components profile manager 550, range from general to specific aspects of user engagement and interaction as described in the innovation previously. Overall, the purpose these operations is to identify and assign affinity data 564 values to a comprehensive profile of user lifestyle and engagement preferences for each user of the system 500 including interaction preferences, habits, conditions, precursors, triggers and other indicators. With preference information clarity and granularity as described previously in the prescribed innovation, profile manager 550 can maintain and provide accurate, timely and in-depth user preference related data to the system 500 overall and related applications such as recommendation, comparative, and predictive analytics. Survey manager 570 may distribute survey 572 to a single individual or a group of individuals. In some examples, survey manager distributes survey 572 to a specific or anonymized group of users based on their relationship or association with a specific user in order to solicit responses about that users preferences, ultimately using the aggregated data to formulate, compare or verify affinity data 564 values associated with a specific user data 558 account.

In some aspects, onboarding application 552 may apply affinity engine 574 processes related to creating a new user account on the system 500. New user accounts may require survey 572 information encompassing broad and general aspects of a user's lifestyle habits, schedules, and preferences as well as more specific or narrow information such as favorite foods, television shows, music selections, activity, or day of the week. For example, during the initial onboarding application 552, a user may respond to a survey 672 regarding favorite colors and provide a response of "blue" using device API 512 controls, whereby user profile data 552 entries for color are cataloged including affinity data 564 the entry as indicated. In a further example, in a maintenance application 554 phase, to verify or confirm affinity data 564 information, the affinity engine 574 and the survey manager 570 may assemble a survey 572 for the same user and present the color blue in different tones and hues with label variations on the color such as light blue, navy, cobalt, royal, and etc. to further identify a user's preference for specific types of colors. In yet a further example, in user data update application 556 phase, where user behavior, activity or API 512 control operation indicates that established affinity data 564 is not accurate based on known circumstances or conditions, the affinity engine 574 and survey manager 570 may assemble a survey 572 of preferred alternatives or recommendations that are unique to presented conditions and circumstances to establish "exceptions" to known affinity data 564 records by subject, user experience, schedule, interaction, participants, and the like. In some examples, user data application 556 may establish that the exceptions to a set of known circumstances or conditions are the norm whereby a rank or rating may be established by the preference analytics module 578. User update application 556 distinguishes preference information including taste, habits, as well as preference substitutes or alternatives in specific instances, and further delineates the hierarchal order of assigning, cataloging and applying affinity data 564 given the myriad of possible interactions users may experience. In some aspects, affinity engine 574 operates software applications for identifying, analyzing, correlating, labeling and referencing affinity data 564 to efficiently and consistently provide analysis and identification of user preferences, biases, likes, dislikes, habits, trends and the like. In some examples, affinity engine 574 may be coupled to an optimal conditions module 576. Optimal conditions module 576 processes engagement data 560 and interaction data 562 to identify patterns, trends, precursors or triggers that are present for high, low, favored and unfavored affinity data 564 values that are recorded for a given user during an engagement event or interaction. In some aspects, optimal conditions module 576 is computer application 78. In some examples, affinity engine 574 may be coupled to a preference analytics module 578. Preference analytics module 578 processes engagement data 560 and interaction data 562 to identify comparisons, differences, likenesses that are recorded for a given user during an engagement event or interaction in order to establish ranked and rated preference of affinity values unique to a specific user or group of users. In some aspects, preference analytics module 578 is computer application 78. In some examples, affinity engine 574 may be coupled to a survey recommendation module 580. Survey recommendation module 580 processes user data 558 to compile and map user profile survey information managed by the profile manager 550. In some aspects, survey recommendation module 580 directs selection of survey 572 composition and subject matter to satisfy desired user profile information categories that are identified and mapped. For example, if the desired user information is favorite meal experiences the profile manager will create a preference map, chart or ledger 584, represented in FIG. 5C, of the user profile information required to process recommendations for favorite meal experiences including subcategories (time of day, day of week, food types, food combinations, food temperatures, associated activities, other participants, environmental data, precursors, triggers, and etc.) and associated user preferences and affinity levels. In some aspects, survey recommendation module 580 operates web-based programs to search online sources for survey 572 subject matter.

In some aspects, selection of survey 572 composition and subject matter to satisfy desired user profile information that is depicted, rendered or presented as a preference ledger 584. In some aspects, based on the desired user data 558 to be collected and processed by the profile manager 550, a survey 572 may be selected or created with API 512 controls operated by a user or an administrator 542 on behalf of a user. For example, a survey 572 may be requested or designed to determine the optimal cup of coffee for an individual or group of individuals wherein the subject matter in the survey 572, presented to the subject user(s) in various formats, may include the type of coffee, brand, serving size, temperature, flavorings, sweeteners, typical consumption times, and food compliments that are preferred by the subject user(s). In some examples, surveys 572 may be created or presented with emphasis or bias for one or more subcategories of a preference ledger 584. For a further example, if in the previous scenario iced coffee is a preferred version of subject matter desired by the survey 572 presenter/designer, the survey manager 570 will, using a combination of profile manager 550 components, adjust the survey 572 composition accordingly including language, words, phrases, nuance, images, video representations, previous experience data records, and the like. And, based on response results from a distributed survey 572, preference ledger 584 data and user data 558 may change in classification, order, rank, rating, and the like. In some aspects, preference ledger 584 data may include profile manager 550 calculations that identify user data 558 affinity levels for categories and sub-categories within a validation range and/or error ratio that reflects a probability of accuracy. In some aspects, survey 572 information is collected by the profile manger 550 such that reliable affinity data 564 can be processed within an acceptable range of validity and/or error ratio. In some examples, preference ledger 584 data may be presented to users (subjects, associated users, known groups and anonymized groups) via the preference analytics module 578 in survey 572 formats that enable profile manager 550 artificial intelligence applications to query users and learn, from users directly or those associated with them as described above), any contextual, conditional, pre-conditions, triggers and other variables that, based on their calculated value, identify a validation range and/or error ratio of known user data 558 affinity levels.

In some aspects, survey 572 content may be uniquely customized to a system 500 user based on relevant user data 558 profile information and associated preference ledgers 584. Relevant user data 558 may be designated by API 512 user controls or profile manager 550 automated programming that identifies preference ledger 584 subjects, subject categories and sub-categories. In some aspects, affinity engine 574, coupled to other components of profile manager 550, may recommend survey content 572 information to users for query or presentation purposes. In the present example, survey content 572 may be recommended to users based on affinity level, desired preference ledger 584 information, depth or nuance of categories or subcategories of a subject matter, status of the user, and the like. In some examples, survey 572 information may include a title, subject, participation instructions, content origin, background information, embedded metadata, web-based reference information, response options, timestamp, and other system related content. In some examples, survey 572 content may encompass a vast range of subjects including categories and subcategories such as colors, music, television genres, film genres, sleep, foods, medical status, mental health, favorite activities and the like. In some aspects, survey 572 response options may vary depending on user profile, device capability or API 512 settings. For example, for one user an audible response may be solicited, another may desire a numerical list, still another may require a device that measures haptic gestures, and another user may require a device that measures facial expressions and emotions, and for a specific type of audience all response options may be made available. In some examples, survey manager 570 may adjust presentation of survey 572 information according to API 512 settings. In other examples, survey manager 570 may manage survey 572 presentations in a sequential order or fashion consistent with preference ledger 584 hierarchy of subject to category then category to subcategory. To further this example, if a subject regarding vehicle driving preference is sought, survey manager 570 will first survey the category level first, such as type of vehicle and color, then subcategories, such as desired participants, locations, day of the week, destinations, speed, associated activities, and etc.

Overall, survey 572 information is generated to identify user preferences related to lifestyle engagements; as individuals existing within a ubicomp, users connected to ubicomp system components, users connecting with other system users, and users accessing $3^{rd}$ party networked computerized applications for services designed for user engagements and interactions.

The innovations described herein are considered novel over the prior art of record. Descriptions of essential elements in this specification, including depictions in drawings, words and phrases, may have common meaning as well as unique definition as presented in the disclosure. Therefore, where an element has been defined sufficiently such that one or more interpretations may be applied, then its use should be afforded the broadest interpretation as supported by the specification.

The elements defined in the disclosure are meant to include any equivalent or combination of elements (one element replaced by two or more; one element replacing two or more) structurally, materially or acts for performing substantially the same function or operation to achieve or practice essential the same result.

It should be understood that the figures in the attachments, which highlight the structure, methodology, functionality and advantages of this disclosure, are presented for example purposes only. This disclosure is sufficiently flexible and configurable, such that it may be implemented in ways other than that shown in the accompanying figures.

What is claimed is:

1. A method of personalizing recommendations by calculating behavioral measurement data of at least one human from at least two ubicomp devices each positioned apart from each other for spatial diversity, the method comprising the steps of:
   generating independent behavioral measurement data from each of the at least two ubicomp devices;
   collecting each of the independent behavioral measurement data into at least one responsive device;
   conglomerating each of the independent behavioral measurement data in the at least one responsive device;
   converting the conglomerated independent behavioral measurement data into at least one standardized data format for the at least one responsive device;
   classifying the converted conglomerated independent behavioral measurement data into interaction preferences associated with the at least one human in the at least one responsive device; and
   transmitting personalized recommendations responsive to the interaction preferences associated with the at least one human by the at least one responsive device based on the classified converted conglomerated independent behavioral measurement data.

2. The method of claim 1, further comprising pairing the at least two ubicomp devices.

3. The method of claim 2, wherein the at least two ubicomp devices comprise at least one of a smart meter, a smart thermostat, a smart temperature sensor, a smart humidity sensor, a smart barometric sensor, a smart pressure sensor, a smart motion sensor, a smart frequency sensor, a smart radiation sensor, a smart light sensor, an IoT device, a smartphone, a smart watch, a smart microwave, a smart oven, a smart toaster, a smart coffee maker, a smart dishwasher, a smart refrigerator, a smart water faucet, a smart vacuum, a smart toy, a smart tracker, a smart door locks, a smart irrigation system, a smart energy monitoring, and a smart voice activated service.

4. The method of claim 3, wherein the step of transmitting recommendations comprises:
   using an inference recommendation engine system to generate interaction recommendations to the at least one human.

5. The method of claim 4, wherein the generated tracking data comprise activity and behavioral data from the at least one human, and the method further comprises:
   analyzing the activity and the behavioral data from the each of the generated tracking data.

6. The method of claim 5, wherein the method further comprises:
   generating the interaction recommendations of the at least one human in response to analyzing the activity and the behavioral data.

7. The method of claim 6, wherein the interaction recommendations comprises at least one of time, location, frequency, duration and sentiments.

8. The method of claim 7, further comprising:
   updating the interaction recommendations on at least one of a time frequency basis, a motion level basis, a temperature level basis, a humidity level basis, a barometric level basis, a light level basis, a frequency level basis and a radiation level basis.

9. The method of claim 8, wherein the step of transmitting recommended interactions comprises:
generating a feedback to the paired at least two ubicomp devices.

10. The method of claim 9, further comprising the step of:
storing the generated tracking data in at least one cloud computing network.

* * * * *